US012762406B1

(12) United States Patent
Mooney et al.

(10) Patent No.: US 12,762,406 B1
(45) Date of Patent: Oct. 13, 2026

(54) GENERATING PREDICTIVE DATA SEGMENTS USING MACHINE LEARNING MODELS AND NATURAL LANGUAGE PROCESSING TECHNIQUES

(71) Applicant: Chalice Custom Algorithms, Inc., Brooklyn, NY (US)

(72) Inventors: Robert Mooney, Brooklyn, NY (US); Tylynn Pettrey, Tampa, FL (US); Adam Heimlich, New York, NY (US); Ronald Pacheco, Jacksonville, FL (US)

(73) Assignee: Chalice Custom Algorithms, Inc., Brooklyn, NY (US)

( * ) Notice: Subject to any disclaimer, the term of this patent is extended or adjusted under 35 U.S.C. 154(b) by 0 days.

(21) Appl. No.: 19/404,630

(22) Filed: Dec. 1, 2025

(51) Int. Cl.

| | |
|---|---|
| ***G06N 3/08*** | (2023.01) |
| ***G06F 40/284*** | (2020.01) |
| *G06N 3/0455* | (2023.01) |

(52) U.S. Cl.
CPC ............ *G06N 3/08* (2013.01); *G06F 40/284* (2020.01); *G06N 3/0455* (2023.01)

(58) Field of Classification Search
None
See application file for complete search history.

(56) References Cited

U.S. PATENT DOCUMENTS

2023/0316153 A1* 10/2023 Ghosh ................... G06F 16/906 706/12
2024/0370898 A1* 11/2024 Vakil .................. G06Q 30/0269
2025/0068903 A1* 2/2025 Tillman ................. G06N 3/045

* cited by examiner

*Primary Examiner* — Eric Nilsson
(74) *Attorney, Agent, or Firm* — Ashurst Perkins Coie US LLP

(57) ABSTRACT

Systems, methods, and devices generate predictive data segments using machine learning and natural language processing. The method receives training data with digital identifiers and binary classification labels indicating target outcomes. It accesses external data sources containing textual attribute descriptions, which are preprocessed by concatenating multiple descriptions per identifier for large language model input. The model outputs high-dimensional vector embeddings encoding semantic relationships. A neural network trains using these embeddings and classification labels to predict probability scores. For new data, the method preprocesses textual descriptions, generates embeddings via the language model, and applies the neural network to produce probability scores representing conversion propensity values. It selects digital identifiers with scores exceeding a configurable threshold and transmits them to a digital platform for prioritized resource allocation.

20 Claims, 9 Drawing Sheets

400

GENERATING PREDICTIVE DATA SEGMENTS USING MACHINE LEARNING MODELS AND NATURAL LANGUAGE PROCESSING TECHNIQUES

BACKGROUND

Machine learning-based language models represent a class of artificial intelligence (AI) systems trained on text data to understand and generate human-like language. These models can include large language models (LLMs) with billions of parameters, small language models (SLMs) optimized for specific tasks or resource constraints, retrieval-augmented generation (RAG) systems that combine language models with external knowledge retrieval, fine-tuned models adapted for domain-specific applications, foundation models serving as pre-trained bases for specialized tasks, transformer-based architectures utilizing attention mechanisms, generative models capable of producing human-like text, and embedding models that convert textual input into high-dimensional vector representations.

Neural networks are computational models inspired by biological neural systems consisting of interconnected nodes that process information through weighted connections. These networks can learn complex patterns in data through training processes that adjust connection weights based on input-output relationships. In supervised learning scenarios, neural networks are trained using labeled datasets where the desired output is known, allowing the system to learn mappings between input features and target outcomes. The trained networks can then make predictions on new, unseen data based on the patterns learned during training.

SUMMARY

Digital advertising platforms face significant technical challenges in generating accurate audience segments for targeted advertising campaigns. Traditional audience segmentation approaches rely on basic demographic data, geographic information, or simple behavioral patterns to create user groups. These conventional methods often fail to capture the complex semantic relationships and contextual information present in textual attribute descriptions associated with digital identifiers. The limitations of existing segmentation systems result in suboptimal targeting accuracy, inefficient resource allocation, and reduced campaign effectiveness.

Conventional systems typically process textual attribute descriptions using rule-based approaches or simple keyword matching techniques that cannot capture the semantic meaning and contextual relationships within the text. For example, traditional systems can struggle to recognize that “luxury car owner” and “high disposable income” represent semantically related concepts that should be weighted similarly in audience targeting models. These systems also face difficulties in handling the heterogeneous nature of textual data from multiple external sources, which can include varying formats, inconsistent terminology, and different levels of detail across data providers. Furthermore, existing audience segmentation platforms often rely on binary classification approaches that categorize users as either “in” or “out” of a particular audience segment without providing granular probability scores that reflect the likelihood of conversion or engagement. This binary approach fails to capture the nuanced differences between users and prevents optimization of resource allocation based on predicted conversion propensity. The lack of sophisticated natural language processing capabilities in conventional systems also limits their ability to extract meaningful insights from rich textual attribute descriptions that contain valuable semantic information about user characteristics and behaviors.

The disclosed technology addresses these technical limitations by implementing an AI/machine learning-based system that combines machine learning-based language models with neural networks to generate predictive data segments with enhanced accuracy and granularity. Machine learning-based language models can include LLMs, SLMs, RAG systems, fine-tuned models, or other types of models. The system processes textual attribute descriptions through transformer-based architectures that can understand semantic relationships and contextual information, enabling more sophisticated audience targeting than conventional rule-based approaches. By generating high-dimensional vector embeddings that capture the semantic meaning of textual descriptions, the system can identify subtle relationships between different user attributes that can be missed by traditional keyword-based methods. The disclosed system also provides probability scores for each digital identifier rather than binary classifications, enabling more precise resource allocation and campaign optimization. These probability scores represent conversion propensity values that can be used to prioritize targeting efforts and optimize bidding strategies in real-time advertising environments. The system’s ability to process and integrate textual attribute descriptions from multiple external data sources through standardized preprocessing techniques addresses the data heterogeneity challenges faced by conventional platforms.

In particular, the disclosed technology provides a computer-implemented method for generating predictive data segments using machine learning models and natural language processing techniques. The method receives training data including a plurality of training digital identifiers and corresponding binary classification labels, where each binary classification label indicates whether a corresponding training digital identifier is associated with a target outcome. For example, the target outcome can represent various conversion events such as product purchases, service subscriptions, or content engagement activities that constitute measurable business value.

The system accesses one or more external data sources including structured and unstructured data, where the structured and unstructured data includes training textual attribute descriptions associated with the plurality of training digital identifiers. In some implementations, these external data sources can include third-party data providers, demographic databases, and behavioral analytics platforms that provide rich textual descriptions of user characteristics and behaviors. The system preprocesses the training textual attribute descriptions by concatenating multiple training textual attribute descriptions per training digital identifier and formatting the concatenated training textual attribute descriptions for input to a language model. For example, separate descriptions such as “urban professional,” “technology adopter,” and “premium brand preference” can be concatenated into a unified text string that captures the comprehensive profile of each digital identifier.

Moreover, the system inputs the training textual attribute descriptions into the language model to cause the language model to output a plurality of training high-dimensional vector embeddings encoding semantic relationships and contextual information of the training textual attribute descriptions in a continuous vector space. In some implementations, the language model includes a transformer-based architecture with attention mechanisms that can process sequential textual data and generate embeddings with hundreds or thousands of dimensions. These high-dimensional vector embeddings enable mathematical operations such as similarity calculations and clustering algorithms that can identify relationships between different user profiles.

In some implementations, the system trains a neural network. In some implementations, the system uses a pre-trained neural network. The system can train the neural network using the plurality of training high-dimensional vector embeddings and the corresponding binary classification labels, where the neural network learns to predict probability scores for high-dimensional vector embeddings. The binary classification labels can indicate whether each training digital identifier achieved the target outcome, with positive labels representing successful conversions and negative labels representing non-conversions. For example, the neural network can include multiple layers with activation functions that process the embeddings through mathematical transformations to generate predictions about conversion likelihood. In some implementations, the training process involves techniques such as cross-validation and hyperparameter tuning to optimize network performance and prevent overfitting.

In some implementations, the system receives new data including a plurality of new digital identifiers and preprocesses new textual attribute descriptions associated with the plurality of new digital identifiers derived from the one or more external data sources by concatenating multiple new textual attribute descriptions per new digital identifier and formatting the concatenated new textual attribute descriptions for input to the language model. The system inputs the new textual attribute descriptions into the language model to cause the language model to output a plurality of new high-dimensional vector embeddings. In some implementations, the preprocessing of new textual attribute descriptions follows the same procedures established during the training phase to ensure consistency in data representation and model input formatting.

The system generates a plurality of probability scores for the plurality of new digital identifiers by applying the neural network to the plurality of new high-dimensional vector embeddings, where each probability score represents a conversion propensity value for a corresponding new digital identifier. For example, these probability scores can range from 0 to 1, where values closer to 1 indicate higher likelihood of achieving the target outcome, such as completing a product purchase within a specified time period. The system selects a subset of the plurality of new digital identifiers having probability scores exceeding a configurable threshold and transmits the subset of the plurality of new digital identifiers to a digital platform for prioritized resource allocation. In some implementations, the configurable threshold can be adjusted dynamically based on business objectives, budget constraints, or campaign capacity restrictions to optimize targeting effectiveness.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

Figure 1:
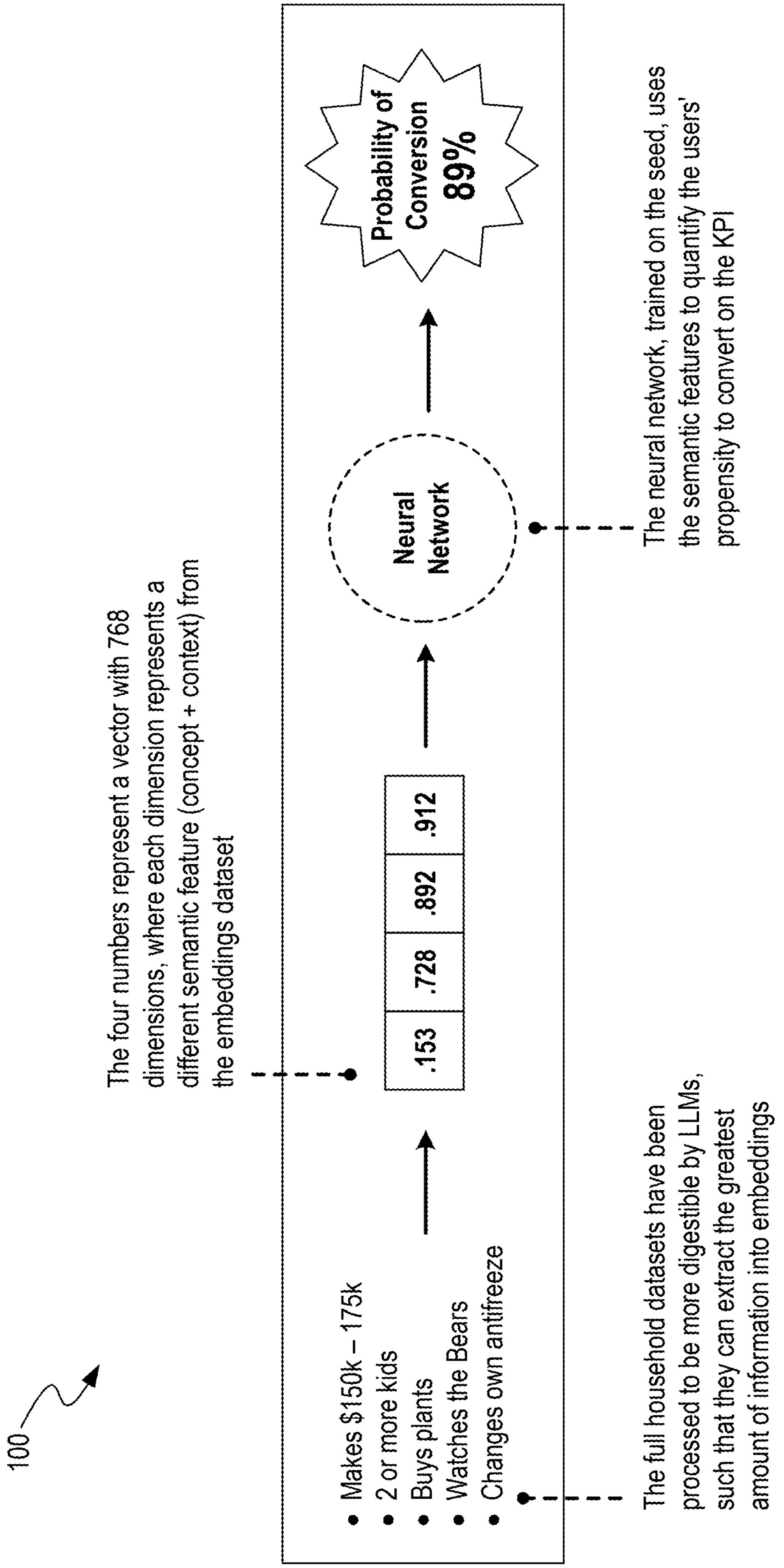
FIG. 1 illustrates a flow diagram showing a process for generating AI-driven audience segments, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to digital advertising and audience segmentation.

The disclosed technology provides systems and methods for generating predictive data segments using machine learning models and natural language processing techniques.

In particular, systems and methods described herein involve processing digital identifiers and textual attribute descriptions through language models to create high-dimensional vector embeddings, training neural networks to predict conversion propensity values, and generating targeted audience segments for digital platform resource allocation. Specifically, the present disclosure will be directed to preprocessing textual attribute descriptions from external data sources, utilizing transformer-based architectures to encode semantic relationships, applying trained neural networks to generate probability scores, and creating data partitions based on configurable thresholds for prioritized targeting.

FIG. 1 illustrates a flow diagram 100 showing a process for generating AI-driven audience segments, in accordance with some implementations of the present technology. The flow diagram 100 begins with household datasets that have been processed to be digestible by language models (LLMs) for extracting information into embeddings. The flow diagram 100 includes a vector with 768 dimensions, where each dimension represents a different semantic feature from the embeddings dataset. The 768-dimensional vector can contain specific numerical values such as 0.153, 0.728, 0.892, and 0.912, which represent concept and context information extracted from input data, such as household income levels, number of children in the household, purchasing behaviors including brand preferences, and activities such as automotive care. These semantic features can encode complex relationships between demographic characteristics and behavioral patterns, enabling the system to capture nuanced user profiles that extend beyond simple categorical classifications. In some implementations, cosine similarity calculations can be used for embedding comparisons and semantic matching to identify relationships between different user profiles.

The flow diagram 100 then shows these vectors being input to a neural network, which uses the semantic features to quantify users' propensity to convert on a key performance indicator (KPI). For example, the KPI can represent product purchase completion, service subscription conversion, or content engagement metrics such as time spent on a website or click-through rates on digital advertisements. The neural network can process the 768-dimensional embeddings through multiple layers of mathematical transformations, applying learned weights and activation functions to generate predictions. The output of the neural network can indicate a probability of conversion of 89%, representing a high likelihood that the corresponding digital identifier will achieve the target outcome. This KPI quantification process can enable precise measurement of conversion propensity across different user segments, facilitating data-driven decision-making for audience targeting and resource allocation strategies.

In particular, the system receives training data including a plurality of training digital identifiers and corresponding binary classification labels, wherein each binary classification label indicates whether a corresponding training digital identifier is associated with a target outcome. Binary classification labels can represent ground truth indicators that specify whether each training digital identifier achieved a desired outcome within a predetermined time window, such as completing a purchase transaction, subscribing to a service, engaging with content, or performing any other measurable action that constitutes business value. These labels can be encoded as binary values where "1" indicates successful achievement of the target outcome and "0" indicates non-achievement, though alternative encoding schemes such as Boolean true/false values or categorical representations can also be implemented.

The target outcome can be defined based on specific business objectives and can include various conversion events such as product purchases exceeding a minimum value threshold, service subscriptions lasting beyond a trial period, content engagement measured by time spent or interaction frequency, lead generation activities including form submissions or contact requests, or composite outcomes that combine multiple behavioral indicators. For example, multiple KPI weighting can involve specific ratios such as 80% for high-value actions and 20% for engagement actions to optimize for business priorities. Training digital identifiers can include user identifiers, device identifiers, household identifiers, or customer identifiers obtained from various digital platforms and data management systems. These identifiers serve as unique references that enable the system to associate behavioral patterns, demographic characteristics, and other attributes with specific entities for subsequent analysis and prediction. This training data forms the foundation for supervised learning, enabling the neural network to learn patterns that distinguish between digital identifiers that are likely to achieve the target outcome and those that are not.

The system accesses one or more external data sources including training textual attribute descriptions associated with the plurality of training digital identifiers. The one or more external data sources can include structured and unstructured data. The structured and unstructured data can include training textual attribute descriptions associated with the plurality of training digital identifiers. External data sources can include third-party data providers, demographic databases, behavioral analytics platforms, social media platforms, transaction processing systems, and customer relationship management systems. Third-party data providers can include demographic and behavioral data sources that provide comprehensive user profiling information. Structured data refers to information organized in predefined formats such as database tables, spreadsheets, or standardized data schemas, while unstructured data includes free-form text, social media posts, product reviews, or other content without predetermined organization. Training textual attribute descriptions represent human-readable descriptions of characteristics, behaviors, preferences, or attributes associated with each digital identifier. For example, these descriptions can include statements such as "high-income household with children," "frequent online shopper," "technology enthusiast," or "environmentally conscious consumer." The system can access these data sources through application programming interfaces (APIs), data feeds, batch file transfers, or real-time streaming connections, depending on the specific requirements and capabilities of each data provider. In some implementations, data warehouses can integrate for large-scale data processing to handle the volume and complexity of external data sources.

The training textual attribute descriptions can include demographic segment descriptions, behavioral attribute descriptions, and household characteristic descriptions. Demographic segment descriptions can encompass age ranges such as "25-34 years old" or "senior citizen," income levels including "high household income" or "middle-class earnings," education backgrounds such as "college graduate" or "advanced degree holder," geographic locations including "urban professional" or "suburban resident," family composition descriptors like "household with children" or "empty nester," and occupation categories such as "technology professional" or "healthcare worker." Behavioral attribute descriptions can include purchasing patterns such as “frequent online shopper” or “brand loyal consumer,” brand preferences including “luxury brand affinity” or “value-conscious buyer,” online activity levels such as “heavy internet user” or “social media active,” content consumption habits including “streaming service subscriber” or “news reader,” and engagement frequencies such as “regular email opener” or “mobile app user.” Household characteristic descriptions can encompass property ownership status such as “homeowner” or “renter,” vehicle ownership including “luxury car owner” or “multiple vehicle household,” lifestyle preferences such as “fitness enthusiast” or “outdoor recreation participant,” and consumption patterns including “organic food buyer” or “technology early adopter.” Identity resolution can involve mapping between different identifier types (RAMP ID, LUID, TDID, UID2) to enable cross-platform audience targeting and measurement. In some implementations, identifier filtering can exclude identifiers older than 90 days to ensure data freshness and relevance.

In some implementations, preprocessing the training textual attribute descriptions further includes applying text normalization and tokenization processes to standardize textual formats across different data sources. Text normalization can involve standardizing textual data by converting to consistent case formats such as lowercase or title case, removing special characters and punctuation marks, correcting spelling variations and typos, resolving abbreviations to their full forms such as expanding “HH” to “household,” and standardizing date formats and numerical representations. Tokenization processes can break down textual descriptions into individual words, phrases, or semantic units that can be processed by machine learning algorithms, including word-level tokenization that separates text into individual words, subword tokenization that handles out-of-vocabulary terms, and sentence-level tokenization for longer text passages. Moreover, the system can apply additional preprocessing techniques such as stemming to reduce words to their root forms, lemmatization to convert words to their dictionary forms, and stop word removal to eliminate common words that provide little semantic value. In some implementations, schema-agnostic processing can automatically infer column types (categorical, numerical, datetime) to handle diverse data formats efficiently.

The system preprocesses the training textual attribute descriptions by (i) concatenating multiple training textual attribute descriptions per training digital identifier and (ii) formatting the concatenated training textual attribute descriptions for input to a language model. Concatenating multiple textual attribute descriptions can involve combining various descriptive elements associated with a single digital identifier into a unified text string that captures the comprehensive profile of that identifier. For example, separate descriptions such as “urban professional,” “technology adopter,” and “premium brand preference” can be concatenated into a single input string using various concatenation strategies. The concatenation process can include adding separator tokens such as commas, semicolons, or special delimiter characters to maintain boundaries between different attributes, preserving semantic relationships by grouping related attributes together, and ensuring that the combined text maintains logical coherence and readability. Text concatenation can use delimiter strategies including commas, semicolons, or special tokens to optimize semantic understanding by the language model. The system can implement different concatenation approaches including simple string joining with delimiters, weighted concatenation that emphasizes more important attributes through repetition or special markers, structured formatting that preserves attribute categories through hierarchical organization, and template-based concatenation that follows predefined patterns for consistent formatting.

Formatting the concatenated textual attribute descriptions for language model input can involve structuring the text according to the specific requirements of the chosen language model architecture, including proper tokenization that converts text into numerical tokens, sequence length management to ensure inputs fit within model constraints, special token insertion such as start-of-sequence and end-of-sequence markers, and padding or truncation to achieve uniform input lengths. Sequence length management can include padding and truncation for uniform input lengths to optimize batch processing efficiency. The formatting process can also include encoding considerations such as character encoding standardization, handling of unicode characters, and preservation of semantic meaning during the conversion process. In some implementations, the system can apply attention mechanisms during concatenation to emphasize more relevant attributes or use hierarchical structuring to maintain relationships between different attribute types.

The language model can include a transformer-based architecture with attention mechanisms. The language model can be any of the models described in relation to FIG. 6 or described herein. For example, language models can include LLMs, SLMs, RAG systems, fine-tuned models, or other types of models. In some implementations, embedding models similar to those developed by specialized AI research organizations can be used as the language model implementation, providing efficient processing of textual attribute descriptions. Transformer-based architectures can represent a class of neural network models that utilize self-attention mechanisms to process sequential data, enabling the model to weigh the importance of different parts of the input when generating representations. These architectures can include multiple transformer layers, each containing multi-head attention mechanisms that allow the model to focus on different aspects of the input simultaneously, feedforward neural networks that process the attended information, and residual connections that facilitate gradient flow during training. Attention mechanisms can allow the model to focus on relevant portions of the input text while generating embeddings, creating representations that capture both local relationships between adjacent words or phrases and global relationships across the entire input sequence. The attention computation can involve query, key, and value matrices that enable the model to determine which parts of the input are most relevant for generating each element of the output representation. In some implementations, nomic-style embedding models can be used as the language model implementation, providing efficient processing of textual attribute descriptions. Distributed computing platforms with graphics processing unit (GPU) clusters (such as those with multiple A10 GPUs) can process embeddings efficiently, enabling scalable processing of large datasets. Runtime optimization techniques can reduce processing time from weeks to under 48 hours through parallelization and distributed processing frameworks.

For example, the plurality of training high-dimensional vector embeddings have a dimensionality that captures semantic relationships and contextual information from the training textual attribute descriptions. The dimensionality of high-dimensional vector embeddings can typically range from hundreds to thousands of dimensions, such as 256, 512, 768, 1024, or higher dimensional spaces, with each dimension representing a learned feature that captures specific semantic or contextual aspects of the input text. For example, certain dimensions can capture concepts related to income levels and financial status, while others can represent lifestyle preferences such as recreational activities, and still others can encode behavioral patterns such as shopping frequency or brand loyalty. The high-dimensional nature of these embeddings can enable the representation of complex, nuanced relationships between different textual attributes, allowing for fine-grained distinctions between similar but distinct user profiles. In some implementations, the system can utilize pre-trained language models such as transformer variants that have been trained on large text corpora, enabling them to understand general language patterns and semantic relationships that can be applied to the specific domain of audience segmentation. Vector databases can store embeddings with versioning capabilities to maintain historical embedding data and enable model comparison across different time periods.

The system inputs the training textual attribute descriptions into the language model to cause the language model to output a plurality of training high-dimensional vector embeddings encoding semantic relationships and contextual information of the training textual attribute descriptions in a continuous vector space. The process of inputting textual descriptions into the language model involves tokenizing the preprocessed text, converting tokens to numerical representations, and processing these representations through multiple layers of the transformer architecture. The language model processes the input through attention mechanisms that identify relationships between different parts of the text, enabling the model to understand how different attributes relate to each other within the context of each digital identifier.

The continuous vector space representation can enable mathematical operations such as similarity calculations using cosine similarity or Euclidean distance, clustering algorithms that group similar profiles together, vector arithmetic that can reveal semantic relationships, and distance measurements that quantify the degree of similarity or difference between different digital identifiers. In this continuous vector space, similar textual descriptions can be mapped to nearby points, while dissimilar descriptions can be mapped to distant points, creating a geometric representation where semantic similarity corresponds to spatial proximity. The semantic relationships captured in these embeddings can include synonymous concepts such as "wealthy" and "high-income," hierarchical relationships between attributes such as "luxury car owner" being a subset of "vehicle owner," contextual associations that emerge from co-occurrence patterns in the training data, and implicit relationships that the model discovers through its training process. For example, embeddings for "luxury car owner" and "high disposable income" can be positioned close to each other in the vector space due to their semantic relationship, even if these exact phrases never appeared together in the training data. In some implementations, identity resolution can involve mapping between different identifier types to enable cross-platform audience targeting and measurement.

In some implementations, the system trains a neural network using the plurality of training high-dimensional vector embeddings and the corresponding binary classification labels, wherein the neural network learns to predict probability scores for high-dimensional vector embeddings. In some implementations, the system uses a neural network that is already trained to predict probability scores for high-dimensional vector embeddings. The neural network training process can involve feeding the high-dimensional vector embeddings as input features and the binary classification labels as target outputs, enabling the network to learn patterns that distinguish between positive and negative examples. The neural network architecture can include multiple layers such as fully connected layers that perform linear transformations followed by non-linear activation functions, dropout layers for regularization that randomly set some neurons to zero during training to prevent overfitting, batch normalization layers that stabilize training by normalizing inputs to each layer, and activation functions such as ReLU, sigmoid, or tanh that introduce non-linearity to enable complex pattern recognition. Feature stores can provide data versioning and lineage tracking to ensure reproducible model training and enable rollback capabilities when needed.

During training, the network adjusts its internal parameters through backpropagation and gradient descent optimization to minimize prediction errors on the training data. The probability scores generated by the trained neural network represent the likelihood that a given digital identifier will achieve the target outcome, typically expressed as values between 0 and 1, where values closer to 1 indicate higher likelihood of conversion and values closer to 0 indicate lower likelihood. The training process can involve techniques such as cross-validation to assess model performance across different data splits, hyperparameter tuning to optimize network architecture parameters such as learning rate, batch size, and number of layers, and regularization methods including L1 and L2 regularization to prevent overfitting. In some implementations, the system can employ ensemble methods that combine predictions from multiple neural networks to improve overall accuracy and robustness.

Training the neural network can include applying data balancing techniques to address class imbalance between positive and negative binary classification labels. Class imbalance can occur when the training dataset contains significantly more examples of one class than another, such as having many more non-converting users than converting users, which can lead to biased model predictions that favor the majority class and result in poor performance on the minority class. For example, the data balancing techniques include at least one of a synthetic minority oversampling technique, undersampling of majority class samples, or weighted loss functions. Synthetic minority oversampling technique (SMOTE) can involve generating artificial examples of the minority class by creating synthetic data points based on existing minority class samples, using techniques such as interpolation between existing minority samples, adding controlled noise to existing samples, or using generative models to create new realistic examples, effectively increasing the representation of underrepresented outcomes in the training dataset.

Undersampling of majority class samples can involve randomly removing examples from the overrepresented class to create a more balanced dataset, using techniques such as random undersampling that removes samples at random, informed undersampling that removes samples based on certain criteria such as redundancy or noise, or cluster-based undersampling that maintains representative samples from different regions of the feature space, though this approach can result in loss of potentially valuable training information. Weighted loss functions can assign different importance weights to different classes during training, penalizing misclassification of minority class examples more heavily than majority class examples, using techniques such as inverse frequency weighting where weights are inversely proportional to class frequency, cost-sensitive weighting that reflects the business cost of different types of errors, or focal loss that focuses learning on hard examples. The system can also implement techniques such as stratified sampling to ensure representative distribution across different data partitions, cost-sensitive learning that incorporates the business cost of different types of prediction errors, and threshold adjustment methods that optimize the decision boundary based on the desired balance between precision and recall.

Figure 2:
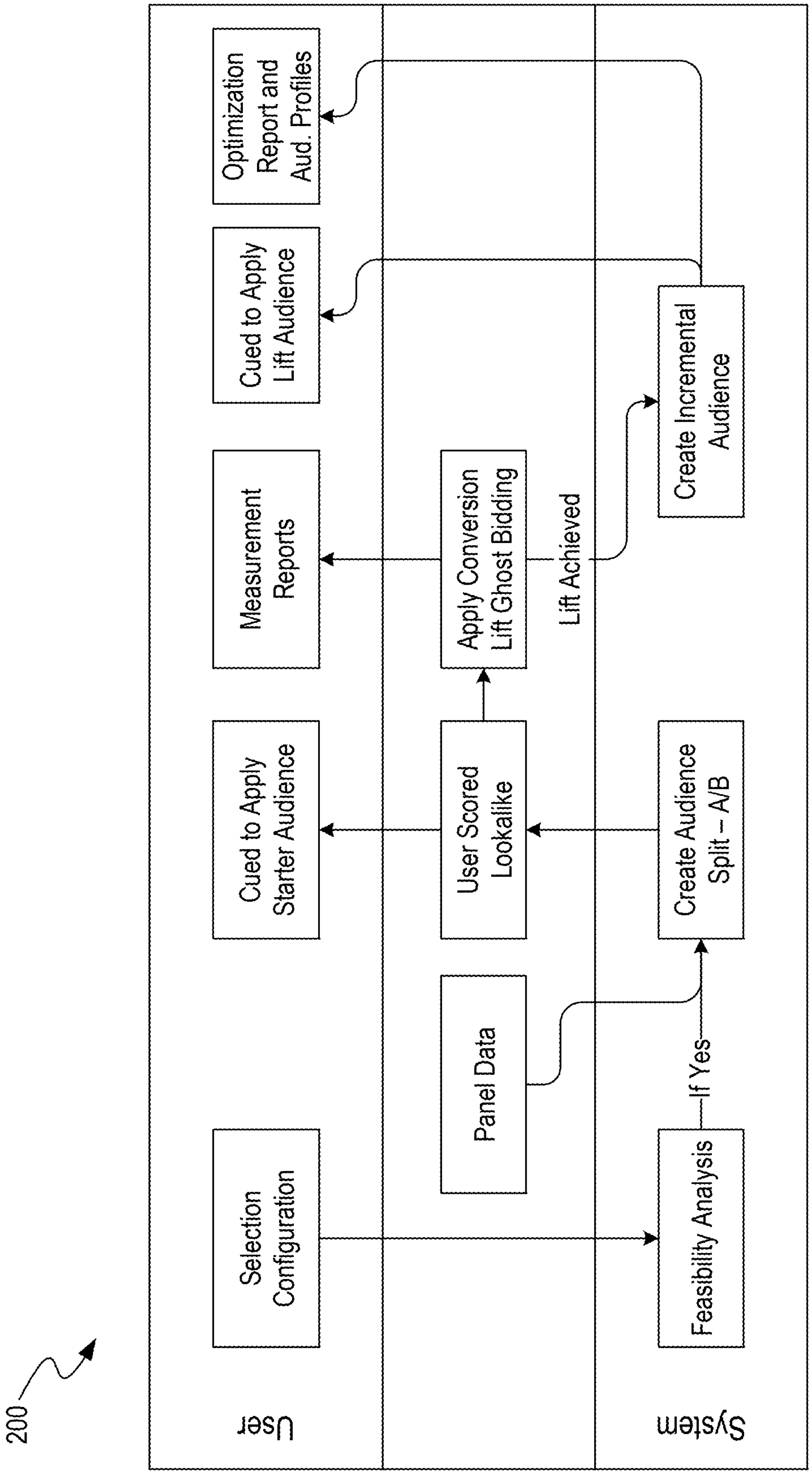
FIG. 2 illustrates a block diagram of an audience generation system, in accordance with some implementations of the present technology.

FIG. 2 illustrates a block diagram of an audience generation system 200, in accordance with some implementations of the present technology. The audience generation system 200 can include a user section and a system section. In the user section, components can include selection configuration that allows users to specify targeting parameters and campaign objectives, cued to apply starter audience that provides initial audience recommendations based on available data, and measurement reports that track performance metrics and campaign effectiveness. The system can be cued to apply lift audience by analyzing conversion performance data to identify high-performing audience segments and automatically suggesting audience optimizations based on statistical lift measurements and incremental conversion analysis. The optimization report and audience profiles can generate comprehensive analytics dashboards with detailed audience segment characteristics, conversion propensity scores, performance benchmarks, and refined audience targeting recommendations based on machine learning insights and predictive modeling results. The processing section can include panel data that provides reference datasets for model training and validation, include feasibility analysis that evaluates the viability of proposed audience targeting strategies, create audience split A/B that generates test and control groups for experimentation, create a user scored lookalike that identifies similar users based on predictive modeling, apply conversion lift ghost bidding that implements optimization strategies without affecting live campaigns, and create incremental audience that develops additional audience segments based on performance insights. Dynamic audience updates can occur every seven days or more frequently based on performance data to ensure optimal targeting effectiveness.

The audience generation system 200 shows data flow connections between these components, with panel data feeding into feasibility analysis through data validation and quality assessment processes, which connects to create audience split A/B when feasibility is confirmed through statistical analysis and business rule validation. The audience split A/B component connects to a user scored lookalike through audience segmentation and similarity matching algorithms, which feeds into apply conversion lift ghost bidding through predictive scoring and optimization logic. The conversion lift ghost bidding component shows a lift achieved connection to create incremental audience through performance measurement and audience expansion algorithms. The components in the processing section provide outputs to corresponding components in the user section through connections that deliver processed results, recommendations, and performance insights, with the cued to apply lift audience component receiving lift measurement data and conversion analytics to generate actionable optimization recommendations, while the optimization report and audience profiles component aggregates performance metrics, audience characteristics, and predictive scores to produce comprehensive reporting dashboards and refined audience segment profiles. The audience generation system 200 demonstrates the integration of machine learning models with practical audience targeting workflows, enabling the transformation of raw data into actionable audience segments for digital platform optimization. API integrations can connect to multiple demand-side platforms (DSPs) to enable cross-platform audience deployment and measurement.

The system receives new data including a plurality of new digital identifiers. New digital identifiers represent fresh data points that were not included in the original training dataset and for which the system needs to generate predictions. These new digital identifiers can be obtained from ongoing data collection processes, real-time data streams, batch data imports, or periodic data updates from external sources. The new digital identifiers maintain the same format and structure as the training digital identifiers, enabling consistent processing through the trained machine learning pipeline. The system can implement data validation procedures to ensure that new digital identifiers meet quality standards and contain sufficient information for accurate prediction. In some implementations, the system can handle streaming data scenarios where new digital identifiers arrive continuously, requiring real-time processing capabilities and efficient resource management. The system can also implement data freshness monitoring to ensure that predictions are generated using the most current available information and can trigger model retraining when the characteristics of new data significantly diverge from the training data distribution.

The system preprocesses new textual attribute descriptions associated with the plurality of new digital identifiers derived from the one or more external data sources by concatenating multiple new textual attribute descriptions per new digital identifier and formatting the concatenated new textual attribute descriptions for input to the language model. The preprocessing of new textual attribute descriptions follows the same procedures established during the training phase to ensure consistency in data representation and model input formatting. The system applies identical text normalization and tokenization processes to maintain compatibility with the trained language model and neural network. Concatenation of multiple new textual attribute descriptions involves combining various descriptive elements associated with each new digital identifier using the same concatenation strategy employed during training. The formatting process ensures that the concatenated text meets the input requirements of the language model, including proper sequence length management, token formatting, and special character handling. In some implementations, the system can implement quality checks to identify and handle cases where new textual attribute descriptions are incomplete, inconsistent, or significantly different from the training data patterns. The system can also apply data augmentation techniques to enhance the quality of new textual descriptions when the available information is sparse or limited.

The system inputs the new textual attribute descriptions into the language model to cause the language model to output a plurality of new high-dimensional vector embeddings encoding semantic relationships and new contextual information of the textual attribute descriptions. The process of generating new high-dimensional vector embeddings utilizes the same language model that was used during the training phase, ensuring consistency in the embedding space and maintaining the semantic relationships learned during training. The new embeddings are generated in the same continuous vector space as the training embeddings, enabling direct comparison and similarity calculations between new and training data points. The language model processes the new textual attribute descriptions through its trained attention mechanisms and transformer layers, producing embeddings that capture the semantic meaning and contextual relationships specific to each new digital identifier. These new embeddings maintain the same dimensionality as the training embeddings and preserve the learned semantic structure that enables the neural network to make accurate predictions. The system can implement embedding quality assessment procedures to identify cases where new textual descriptions produce embeddings that fall outside the expected range or distribution of the training embedding space, potentially indicating data quality issues or significant distribution shifts.

Figure 3:
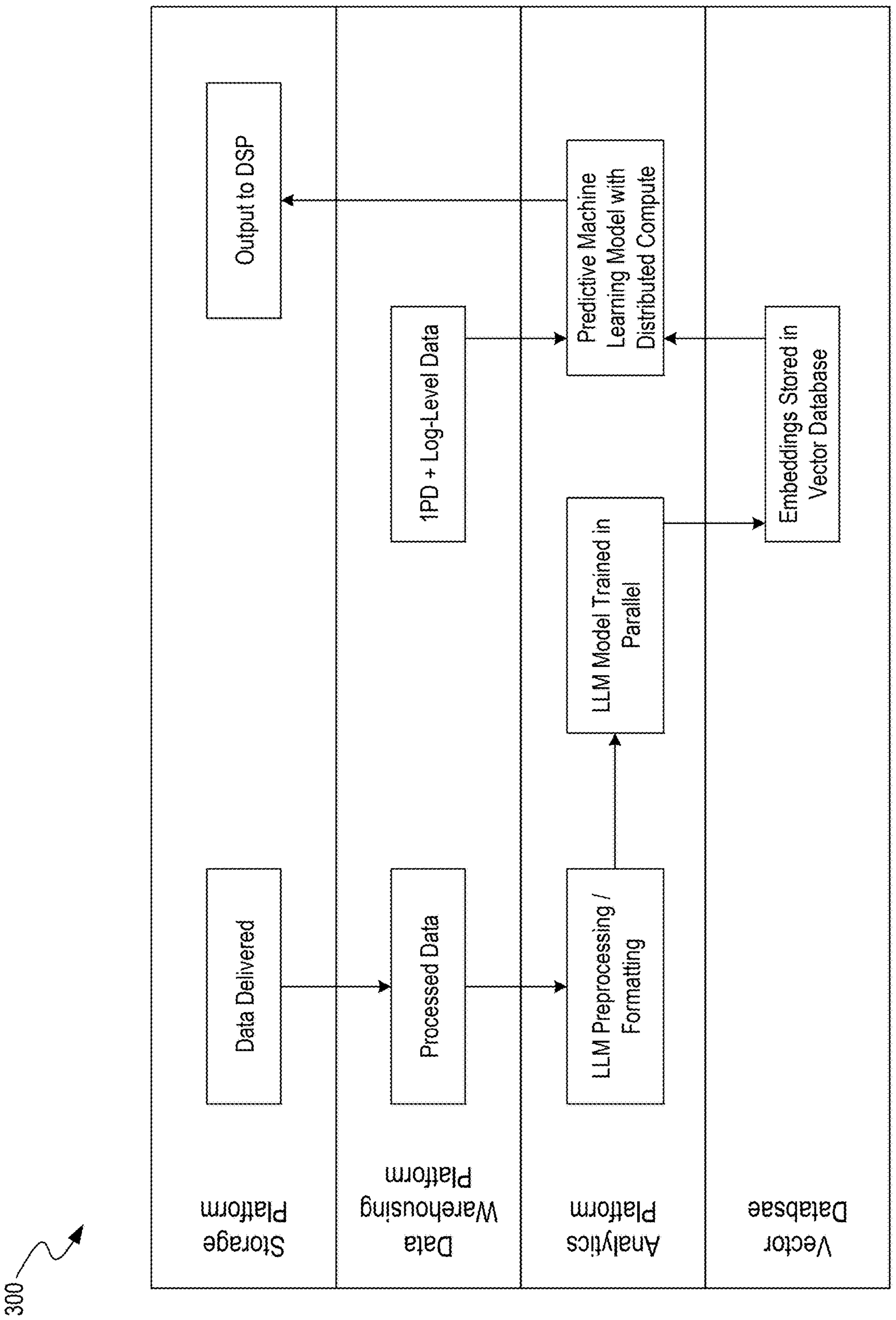
FIG. 3 illustrates a block diagram of an LLM modeling system, in accordance with some implementations of the present technology.

FIG. 3 illustrates a block diagram of an LLM modeling system 300, in accordance with some implementations of the present technology. The LLM modeling system 300 includes multiple processing layers arranged in a hierarchical flow. At the top layer, external data such as demographic and behavioral information can be delivered and processed through data ingestion pipelines that handle various data formats and sources. The processed external data can flow to an LLM preprocessing/formatting stage that prepares textual descriptions for language model input through tokenization, normalization, and sequence formatting operations. The LLM model, trained in parallel via distributed computing frameworks, can process this formatted data through transformer architectures that generate high-dimensional embeddings encoding semantic relationships.

A predictive machine learning model with distributed compute capabilities can receive both the LLM model output in the form of vector embeddings and additional data inputs such as first-party data and log-level behavioral information that provide complementary signals for prediction accuracy. The LLM modeling system 300 can store embeddings in a vector database that enables efficient similarity search and retrieval operations, which feeds back into the predictive machine learning model through embedding lookup and similarity matching processes. The final output from the LLM modeling system 300 can be transmitted to a digital platform such as a DSP that utilizes the predictions for audience targeting and bid optimization. The LLM modeling system 300 demonstrates the technical architecture for implementing large-scale natural language processing and machine learning workflows, showing how different components interact to transform raw textual data into actionable predictions for digital platform optimization.

The system generates a plurality of probability scores for the plurality of new digital identifiers by applying the neural network to the plurality of new high-dimensional vector embeddings, wherein each probability score represents a conversion propensity value for a corresponding new digital identifier. The neural network can be trained by the system or the neural network can be pre-trained. The trained neural network processes each new high-dimensional vector embedding through its learned parameters and activation functions to produce a probability score that represents the likelihood of the corresponding digital identifier achieving the target outcome. Conversion propensity values quantify the predicted likelihood that a specific digital identifier will complete a desired action or achieve a target outcome, typically expressed as a probability between 0 and 1 or as a percentage. The neural network applies the patterns and relationships learned during training to evaluate the semantic and contextual information encoded in each new embedding, generating predictions based on similarities to training examples that achieved positive outcomes. The system can implement batch processing capabilities to efficiently generate probability scores for large numbers of new digital identifiers simultaneously as well as real-time processing capabilities for individual predictions when immediate results are required. In some implementations, the system can provide confidence intervals or uncertainty estimates alongside the probability scores to indicate the reliability of each prediction based on factors such as the similarity of new data to training data and the consistency of predictions across different model components.

The trained neural network can implement various inference architectures including batch processing for large-scale audience generation and real-time processing for individual predictions when immediate results are required. Model serving frameworks can provide load balancing capabilities to distribute prediction requests across multiple computational resources. In some implementations, the system can provide confidence intervals or uncertainty estimates alongside the probability scores to indicate the reliability of each prediction based on factors such as the similarity of new data to training data.

Generating the plurality of probability scores can further include applying a secondary machine learning model to transform the probability scores into bid adjustment values for real-time bidding systems. A secondary machine learning model can represent an additional layer of processing that takes the initial probability scores as input and generates more specialized outputs tailored to specific use cases such as programmatic advertising optimization, dynamic pricing strategies, or resource allocation decisions. This secondary model can utilize algorithms such as gradient boosting, random forests, or additional neural networks that are specifically trained to optimize business outcomes rather than just prediction accuracy. For example, the bid adjustment values are calculated based on a value-to-cost ratio based at least in part on conversion propensity. Bid adjustment values can be multipliers or modifiers that can be applied to base bid amounts in digital platform auctions, enabling dynamic pricing based on the predicted value of each digital identifier, and can range from fractional values like 0.5 for low-value targets to multipliers like 2.0 or higher for high-value prospects. The secondary model can utilize ensemble methods such as gradient boosting, random forests, or additional neural networks that combine multiple prediction approaches to improve accuracy. Model versioning systems can enable A/B testing of different secondary models to optimize business outcomes. Caching strategies can store frequently requested probability scores and bid adjustments to reduce computational overhead and improve response times for real-time applications.

Real-time bidding systems can operate in millisecond timeframes where digital platforms compete in auctions to display advertisements to specific users, requiring rapid decision-making based on predicted user value, and can involve complex auction mechanisms such as second-price auctions, first-price auctions, or header bidding configurations. The value-to-cost ratio can represent the expected return on investment for targeting a specific digital identifier, calculated by comparing the predicted conversion value against the expected cost of reaching that identifier, and can incorporate factors such as historical conversion rates, average order values, customer lifetime value estimates, and competitive bidding landscapes. The secondary machine learning model can incorporate additional factors such as competitive landscape analysis that considers bidding patterns from other advertisers, budget constraints that ensure spending remains within allocated limits, campaign objectives that align bidding strategies with business goals, and historical performance data that informs optimization decisions. This multi-stage approach enables more sophisticated decision-making that goes beyond simple probability prediction to provide actionable business intelligence for digital platform optimization.

The system selects a subset of the plurality of new digital identifiers having probability scores exceeding a configurable threshold and creates a plurality of data partitions by selecting a subset of the plurality of digital identifiers having probability scores exceeding a threshold. The configurable threshold can represent a decision boundary that determines which digital identifiers are considered sufficiently likely to achieve the target outcome to warrant inclusion in targeted campaigns or prioritized resource allocation and can be adjusted dynamically based on business objectives such as maximizing conversions or minimizing cost per acquisition, budget constraints that limit the number of targetable identifiers, campaign capacity restrictions that define maximum audience sizes, or desired precision-recall trade-offs that balance targeting accuracy with reach. For example, an e-commerce retailer launching a premium product campaign can set a threshold of 0.75 to target only users with high purchase propensity, while a subscription service seeking to expand market share can lower the threshold to 0.4 to reach a broader audience. Data partitions can represent organized groupings of digital identifiers that share similar characteristics or probability score ranges, enabling targeted treatment strategies and resource allocation optimization, and can include high-priority segments for premium targeting with probability scores above 0.8, medium-priority segments for standard campaigns with scores between 0.5 and 0.8, and low-priority segments for broad-reach initiatives with scores between 0.3 and 0.5.

Dynamic threshold adjustment can be implemented based on real-time performance feedback that modifies thresholds based on observed conversion rates, campaign budget utilization that adjusts thresholds to maintain spending within allocated limits, or changing business priorities that shift focus between different campaign objectives. The system can implement multi-tier thresholds that create different priority levels for resource allocation, enabling sophisticated audience segmentation strategies.

The selection process can involve ranking digital identifiers by their probability scores and selecting the top-performing candidates based on percentile cutoffs, or it can involve multiple threshold levels that create different tiers of targeting priority based on business rules and campaign requirements. The system can implement dynamic threshold adjustment based on real-time performance feedback that modifies thresholds based on observed conversion rates, campaign budget utilization that adjusts thresholds to maintain spending within allocated limits, or changing business priorities that shift focus between different campaign objectives. In a practical implementation, a financial services company can start a credit card campaign with a threshold of 0.6 but automatically adjust it to 0.7 if early performance data shows higher-than-expected conversion rates, allowing the system to optimize budget allocation in real time. In some implementations, the system can create multiple data partitions with different threshold levels, such as high-priority segments for premium targeting, medium-priority segments for standard campaigns, and low-priority segments for broad-reach initiatives. The partitioning process can also incorporate additional criteria beyond probability scores, such as demographic characteristics, behavioral patterns, or strategic business considerations.

The system transmits the subset of the plurality of new digital identifiers to a digital platform for prioritized resource allocation. Transmitting the selected digital identifiers can involve delivering the curated list of high-probability targets to downstream systems that can execute targeted campaigns, personalized content delivery, or other engagement strategies through various delivery mechanisms such as API calls that provide real-time access to audience segments, file transfers that deliver batch updates of audience lists, database updates that synchronize audience information across systems, or real-time streaming connections that provide continuous audience updates. For instance, a streaming media platform can receive a daily batch file containing 50,000 high-propensity user identifiers for premium subscription targeting, while simultaneously receiving real-time API updates for users whose probability scores have changed based on recent viewing behavior. Digital platforms can include content delivery systems that personalize website experiences, customer relationship management platforms that manage customer interactions, email marketing systems that deliver targeted communications, social media platforms that optimize ad targeting, programmatic advertising platforms that automate media buying, or other channels through which organizations can reach and engage with their target audiences. Prioritized resource allocation can refer to the strategic distribution of limited resources such as an advertising budget that focuses spending on high-value prospects, content creation resources that develop personalized messaging for different audience segments, personnel time that prioritizes outreach to promising leads, or system capacity that ensures that high-priority audiences receive optimal service levels.

Model deployment pipelines can include canary deployment strategies that gradually roll out updated models to minimize risk, blue-green deployment approaches that maintain backup model versions for rapid rollback, and automated monitoring systems that track prediction accuracy and system performance in production environments. API endpoint design can support both synchronous and asynchronous prediction requests to accommodate different integration requirements. The transmission process can involve various data formats such as JSON for API communications, CSV files for batch transfers, or XML for structured data exchange, depending on the technical requirements of the receiving platform. The system can implement data security measures such as encryption during data transmission, authentication protocols that verify system access, access controls that limit data visibility to authorized users, and audit logging that tracks data usage and access patterns to protect the transmitted digital identifier information during transit and storage. In some implementations, the system can provide additional metadata alongside the digital identifiers, such as probability scores that indicate conversion likelihood, confidence levels that reflect prediction reliability, recommended engagement strategies that suggest optimal interaction approaches, or optimal timing information that identifies the best times to reach each audience segment to enhance the effectiveness of the downstream targeting efforts.

Figure 4:
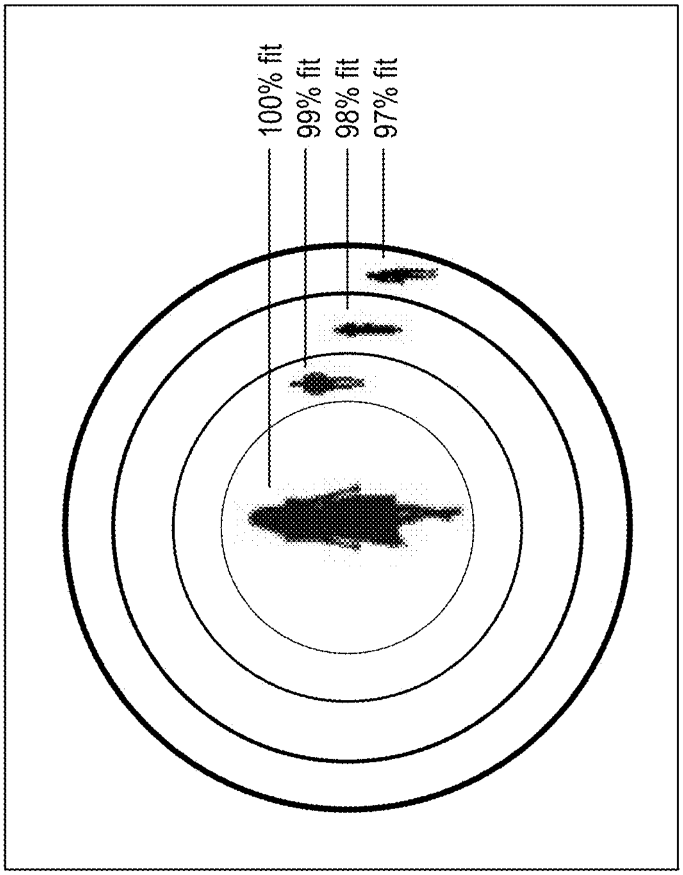
FIG. 4 illustrates a diagram showing concentric circles representing different fit percentages for audience targeting, in accordance with some implementations of the present technology.

FIG. 4 illustrates a diagram 400 showing concentric circles representing different fit percentages for audience targeting, in accordance with some implementations of the present technology. The diagram 400 can depict multiple rings arranged concentrically, with each ring labeled to indicate different fit levels ranging from 97% fit to 100% fit, where the fit percentages represent the degree to which audience members match the target criteria based on their probability scores or conversion propensity values. The concentric circles can provide a visual representation of audience segmentation where the innermost ring represents 100% fit corresponding to digital identifiers with the highest probability scores, and subsequent outer rings represent progressively lower fit percentages of 99%, 98%, and 97% corresponding to decreasing probability score ranges. Different audience members can be classified and prioritized based on their predicted conversion propensity, with those closer to the center receiving higher priority for resource allocation and targeting efforts. This visualization demonstrates the concept of audience segmentation based on probability scores or fit percentages, where digital identifiers with higher conversion propensity values are positioned closer to the center, representing higher priority for resource allocation and targeting efforts.

The system can further include monitoring performance metrics of the subset of the plurality of new digital identifiers, detecting distribution drift in new incoming data by comparing statistical properties of current data against reference baseline data, and automatically triggering retraining of the neural network based on the distribution drift exceeding a predetermined threshold. Performance metrics monitoring can involve tracking key indicators such as conversion rates that measure the percentage of targeted identifiers that achieve the desired outcome, engagement levels that assess user interaction with targeted content, campaign effectiveness metrics that evaluate overall campaign performance, and return-on-investment calculations that compare campaign costs to generated revenue for the selected digital identifiers to assess the accuracy and business value of the predictive model. Distribution drift detection can refer to the identification of significant changes in the statistical characteristics of incoming data compared to the original training data, which can indicate that the model's predictions can become less accurate over time due to evolving user behaviors, market conditions, or data collection processes. Statistical properties can include mean values and variance calculations that describe central tendencies and spread of numerical features, distribution shapes that characterize the overall pattern of data values, correlation patterns that reveal relationships between different variables, and other mathematical characteristics that describe the data structure and can be compared between current and historical datasets. Reference baseline data can represent the statistical profile of the original training dataset, serving as a benchmark for comparison with new incoming data, and can include summary statistics, distribution parameters, and correlation matrices that capture the essential characteristics of the training data.

Online learning capabilities can enable incremental model updates without full retraining, allowing the system to adapt to changing user behaviors and market conditions. Model compression techniques such as quantization and pruning can optimize deployed models for faster inference while maintaining prediction accuracy. Edge deployment strategies can distribute model inference closer to data sources to reduce latency and improve real-time performance. The predetermined threshold can define the acceptable level of statistical deviation before triggering corrective actions, balancing the need for model stability with responsiveness to changing data patterns, and can be set based on statistical significance tests, business impact assessments, or historical performance analysis. Automatic retraining can involve updating the neural network with new data to maintain prediction accuracy and adapt to evolving patterns in the target population, using techniques such as incremental learning that updates existing models with new data, full retraining that rebuilds models from scratch with combined old and new data, or transfer learning that adapts pre-trained models to new data patterns. This continuous monitoring and adaptation capability ensures that the predictive system remains effective over time despite changes in user behavior, market conditions, or data collection processes.

In some implementations, the trained model application can implement transfer learning techniques to adapt existing models to new domains or customer segments without requiring complete retraining. Transfer learning enables the system to leverage knowledge gained from training on one dataset or domain and apply it to related but distinct domains, significantly reducing computational requirements and training time. For example, a model trained on e-commerce conversion data can be adapted for subscription service targeting by fine-tuning only the final layers while preserving the learned semantic representations from the language model embeddings. This approach is particularly valuable when entering new market segments where limited historical data is available, as the pre-trained embeddings capture general semantic relationships that remain relevant across different business contexts. The transfer learning process can involve domain adaptation techniques such as feature alignment, where the system maps embeddings from the source domain to the target domain through learned transformation matrices, or adversarial training methods that minimize domain-specific differences while preserving predictive accuracy.

Multi-task learning implementations can enable a single model to predict multiple outcomes simultaneously, such as conversion probability, engagement likelihood, and customer lifetime value. This unified approach allows the neural network to learn shared representations that capture common patterns across different prediction tasks, improving overall model efficiency and reducing infrastructure requirements compared to maintaining separate models for each outcome. The multi-task architecture can include shared embedding layers that process textual attribute descriptions through the language model, followed by task-specific prediction heads that generate probability scores for different business objectives. Cross-task regularization techniques can prevent overfitting to any single objective while encouraging the model to learn generalizable features that benefit all prediction tasks. The system can implement task weighting strategies that dynamically adjust the importance of different objectives based on business priorities or performance metrics, enabling adaptive optimization that responds to changing market conditions. Streaming inference capabilities can process continuous data feeds and update predictions in real time as new information becomes available.

These capabilities require sophisticated data pipeline architectures that can handle high-velocity data streams while maintaining prediction accuracy and system responsiveness. The streaming system can implement incremental learning algorithms that update model parameters based on new data points without requiring full retraining, using techniques such as online gradient descent or mini-batch updates that process small data chunks continuously. Real-time feature engineering pipelines can preprocess incoming textual attribute descriptions, generate embeddings through the language model, and apply the trained neural network to produce updated probability scores within milliseconds of data arrival. The system can implement caching mechanisms that store frequently accessed embeddings and predictions to reduce computational overhead while maintaining data freshness through intelligent cache invalidation strategies based on data age and prediction confidence levels.

Example Methods of Operation of the Transmission Platform

Figure 5:
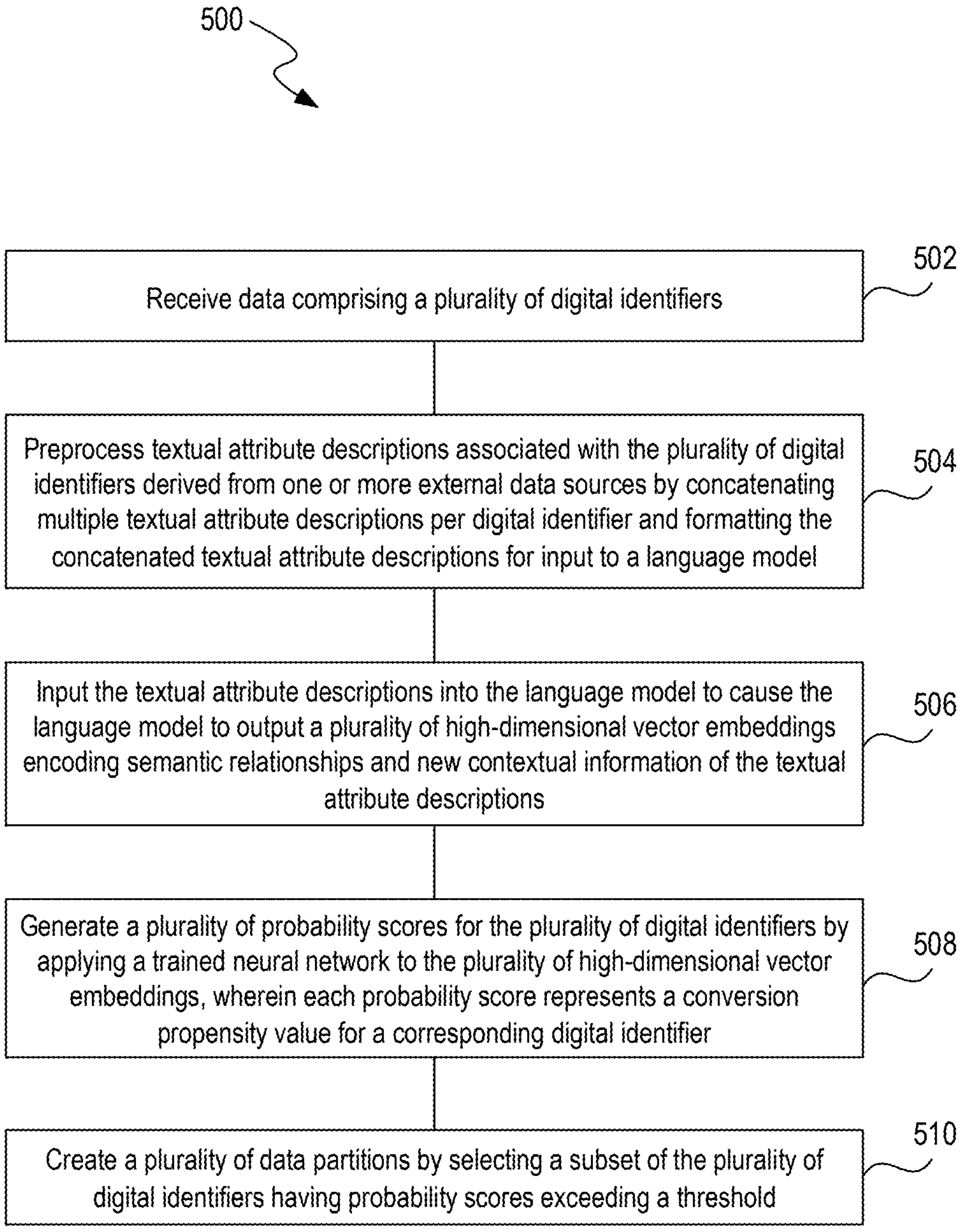
FIG. 5 illustrates a flowchart of a method for generating predictive data segments, in accordance with some implementations of the present technology.

FIG. 5 is a flowchart depicting an example method 500 for generating predictive data segments, in accordance with some implementations of the present technology. In some implementations, the method 500 is performed by components of the example computer system 800 illustrated and described in more detail with reference to FIG. 8. Likewise, implementations can include different and/or additional operations or can perform the operations in different orders. The method 500 provides a systematic approach for processing digital identifiers and textual attribute descriptions to generate predictive data segments through machine learning models and natural language processing techniques.

In operation 502, the system receives data including a plurality of digital identifiers. For example, the digital identifiers can include user identifiers, device identifiers, household identifiers, or customer identifiers obtained from various digital platforms and data management systems. The digital identifiers serve as unique references that enable the system to associate behavioral patterns, demographic characteristics, and other attributes with specific entities for subsequent analysis and prediction. This operation represents the foundational data ingestion phase where unique identifiers are collected from various sources to establish the basis for predictive modeling and audience segmentation.

In operation 504, the system preprocesses textual attribute descriptions associated with the plurality of digital identifiers derived from one or more external data sources by concatenating multiple textual attribute descriptions per digital identifier and formatting the concatenated textual attribute descriptions for input to a language model. For example, the textual attribute descriptions can include demographic segment descriptions, behavioral attribute descriptions, and household characteristic descriptions that are normalized and tokenized to standardize textual formats across different data sources. The preprocessing operation transforms heterogeneous textual data into a unified format suitable for language model processing, ensuring consistent semantic representation across diverse data sources and attribute types.

In operation 506, the system inputs the textual attribute descriptions into the language model to cause the language model to output a plurality of high-dimensional vector embeddings encoding semantic relationships and contextual information of the textual attribute descriptions. For example, the language model can be a transformer-based architecture with attention mechanisms that converts textual descriptions into numerical vector representations with hundreds or thousands of dimensions. Each high-dimensional vector embedding captures semantic meaning and contextual relationships within the textual attributes, enabling mathematical operations for similarity calculations and pattern recognition in continuous vector space.

In operation 508, the system generates a plurality of probability scores for the plurality of digital identifiers by applying a trained neural network to the plurality of high-dimensional vector embeddings, wherein each probability score represents a conversion propensity value for a corresponding digital identifier. For example, the neural network can be trained using supervised learning techniques with binary classification labels to predict the likelihood of target outcomes such as purchase conversions, engagement behaviors, or other KPIs. The probability scores provide quantitative measures of conversion propensity that enable data-driven decision-making for audience targeting and resource allocation strategies.

In operation 510, the system creates a plurality of data partitions by selecting a subset of the plurality of digital identifiers having probability scores exceeding a threshold. For example, the threshold can be determined through statistical analysis, business requirements, or optimization algorithms to identify the most promising digital identifiers for targeted campaigns or prioritized resource allocation. The data partitioning process segments the digital identifiers based on their predicted conversion propensity, enabling focused marketing efforts and improved campaign effectiveness through selective targeting of high-value prospects.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer"), and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks, and there can be more complex neural network designs that include feedback connections, skip connections, or other such possible connections between neurons or layers, which are not discussed in detail here.

A deep neural network (DNN) is a type of neural network that has multiple layers or a large number of neurons. The term "DNN" can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, audience segmentation, digital advertising targeting, etc.) in order to improve the accuracy of outputs (e.g., more accurate predictions) as compared, for example, with models with fewer layers. In the present disclosure, the term "machine learning-based model" or, more simply, "machine learning model" can be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset can be a collection of text documents, referred to as a "text corpus" (or simply referred to as a "corpus"). The corpus can represent a language domain (e.g., a single language) or a subject domain (e.g., digital advertising, audience segmentation) or can encompass another domain or domains, be they larger or smaller than a single language or subject domain. For example, a relatively large, multilingual, and non-subject-specific corpus can be created by extracting text from online web pages or publicly available social media posts. Training data can be annotated with ground truth labels (e.g., each data entry in the training dataset can be paired with a label) or can be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding machine learning model input (e.g., in the case of an autoencoder) or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data can be a subset of a larger dataset. For example, a dataset can be split into three mutually exclusive subsets: a training set, a validation (or cross-validation) set, and a testing set. The three subsets of data can be used sequentially during machine learning model training. For example, the training set can be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set can then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) can begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) can begin. The output generated from the testing set can be compared with the corresponding desired target values to give a final assessment of the trained machine learning model's accuracy. Other segmentations of the larger dataset or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training can be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed, and the machine learning model can be deployed to generate output in real-world applications (also referred to as "inference").

In some examples, a trained machine learning model can be fine-tuned, meaning that the values of the learned parameters can be adjusted slightly in order for the machine learning model to better model a specific task. Fine-tuning of a machine learning model typically involves further training the machine learning model on a number of data samples (which can be smaller in number/cardinality than those used to train the model initially) that closely target the specific task. For example, a machine learning model for generating natural language, e.g., for audience segment descriptions or digital advertising targeting, can be fine-tuned by further training using specific training samples. The specific training samples can be used to generate language in a certain style or in a certain format. For example, the machine learning model can be trained to generate audience segment profiles having a particular style and structure for specific digital advertising campaigns.

Some concepts in machine learning-based language models are now discussed. It can be noted that while the term "language model" has been commonly used to refer to a machine learning-based language model, there can exist non-machine-learning-language-based models. In the present disclosure, the term "language model" can refer to a machine learning-based language model (e.g., a language model that is implemented using a neural network or other machine learning architecture) unless stated otherwise. For example, unless stated otherwise, the "language model" encompasses LLMs, SLMs, RAG systems, fine-tuned models, and other types of models.

A language model can use a neural network (typically a DNN) to perform NLP tasks. A language model can be trained to model how words relate to each other in a textual sequence based on probabilities. A language model can contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for audience segmentation systems (e.g., digital advertising audience targeting).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any machine learning-based language model, including language models based on other neural network architectures, such as RNN-based language models.

Figure 6:
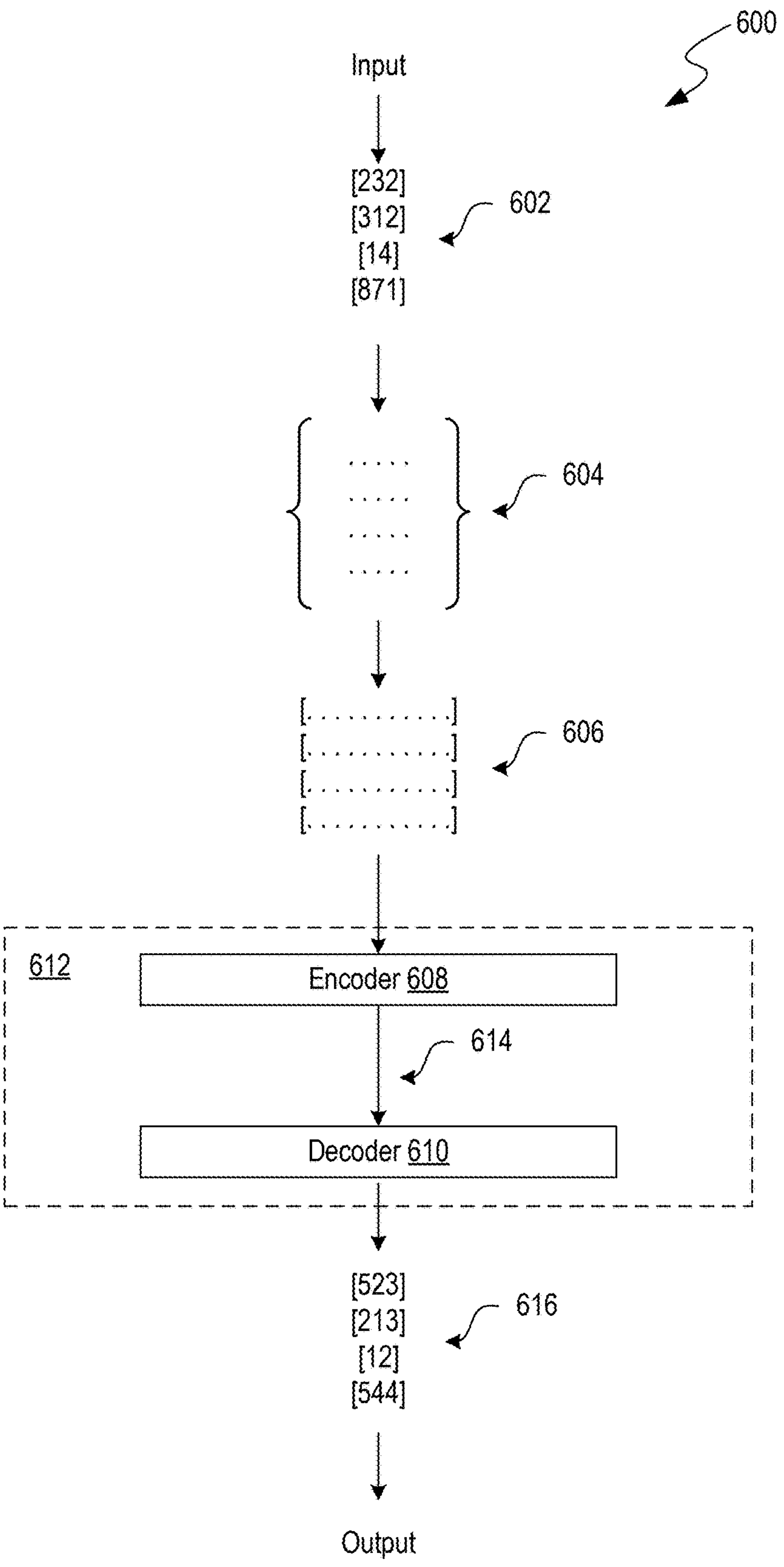
FIG. 6 is a block diagram of an example transformer, in accordance with one or more implementations of the present technology.

FIG. 6 is a block diagram 600 of an example transformer, in accordance with one or more implementations of the present technology. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure can be applicable to any machine learning-based language model, including language models based on other neural network architectures, such as RNN-based language models.

The transformer 612 includes an encoder 608 (which can include one or more encoder layers/blocks connected in series) and a decoder 610 (which can include one or more decoder layers/blocks connected in series). Generally, the encoder 608 and the decoder 610 each include multiple neural network layers, at least one of which can be a self-attention layer. The parameters of the neural network layers can be referred to as the parameters of the language model.

The transformer 612 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of audience segment profiles or digital advertising categories for a digital advertising platform. Writing a rough draft can include generating writing in a particular style that can be useful as a starting point for the user's writing. The style can be identified as, e.g., an audience segment profile, a digital advertising summary, an audience segment description, or a digital advertising recommendation. Fixing spelling and grammar can include correcting errors in an existing input text. Translating can include converting an existing input text into a variety of different languages. In some implementations, the transformer 612 is trained to perform certain functions on input formats other than natural language input. For example, the input can include objects, images, audio content, video content, or a combination thereof.

The transformer 612 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

Figure illustrates how the transformer 612 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list or a paragraph), an [EOT] token can be another special token that indicates the end of the textual sequence, other tokens can provide formatting information, etc.

As shown in the block diagram 600, a short sequence of tokens 602 corresponding to the input text is illustrated as input to the transformer 612. Tokenization of the text sequence into the tokens 602 can be performed by some preprocessing tokenization module, such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 612 can be of any length up to a maximum length defined based on the dimensions of the transformer 612. Each token 602 in the token sequence is converted into an embedding 606 (also referred to as an "embedding vector").

An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained machine learning model can be used to convert the token 602 into an embedding 606. In particular, another trained machine learning model can be used to convert the token 602 into an embedding 606 in a way that encodes additional information into the embedding 606 (e.g., a trained machine learning model can encode positional information about the position of the token 602 in the text sequence into the embedding 606). In some implementations, the numerical value of the token 602 can be used to look up the corresponding embedding in an embedding matrix 604, which can be learned during training of the transformer 612.

The generated embeddings, e.g., such as the embedding 606, are input into the encoder 608. The encoder 608 serves to encode the embedding 606 into feature vectors 614 that represent the latent features of the embedding 606. The encoder 608 can encode positional information (i.e., information about the sequence of the input) in the feature vectors 614. The feature vectors 614 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 614, that can be generated by the encoder 608 can be referred to as a latent space or feature space.

Conceptually, the decoder 610 is designed to map the features represented by the feature vectors 614 into meaningful output, which can depend on the task that was assigned to the transformer 612. For example, if the transformer 612 is used for an audience segmentation task, the decoder 610 can map the feature vectors 614 into text output describing audience segment profiles or digital advertising recommendations. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 can generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some implementations, the input provided to the transformer 612 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include digital identifier behavioral data prepared by a system, and the output can include a high-level audience segment profile of the digital identifier segment. In other examples, the input provided to the transformer includes a question or a request to generate text. The output can include a response to the question, text associated with the request, or a list of ideas associated with the request. For example, the input can include the question, "What digital advertising content can appeal to high-conversion users?" and the output can include a description of relevant digital advertising categories. As another example, the input can include a request to generate segment profiles for digital advertising users, and the output can include a list of relevant audience segment descriptions.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,044 input tokens), and is able to generate a large number of tokens as output (e.g., up to 2,044 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or preprocessed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

The above-described implementations of the present disclosure are presented for purposes of illustration, not of limitation, and the present disclosure is limited only by the claims that follow. Furthermore, it should be noted that the features and limitations described in any one implementation can be applied to any other implementation herein, and flowcharts or examples relating to one implementation can be combined with any other implementation in a suitable manner, done in different orders, or done in parallel. In addition, the systems and methods described herein can be performed in real time. It should also be noted that the systems or methods described above can be applied to, or used in accordance with, other systems or methods.

Example Implementation of the Model of the Audience Generation System

Figure 7:
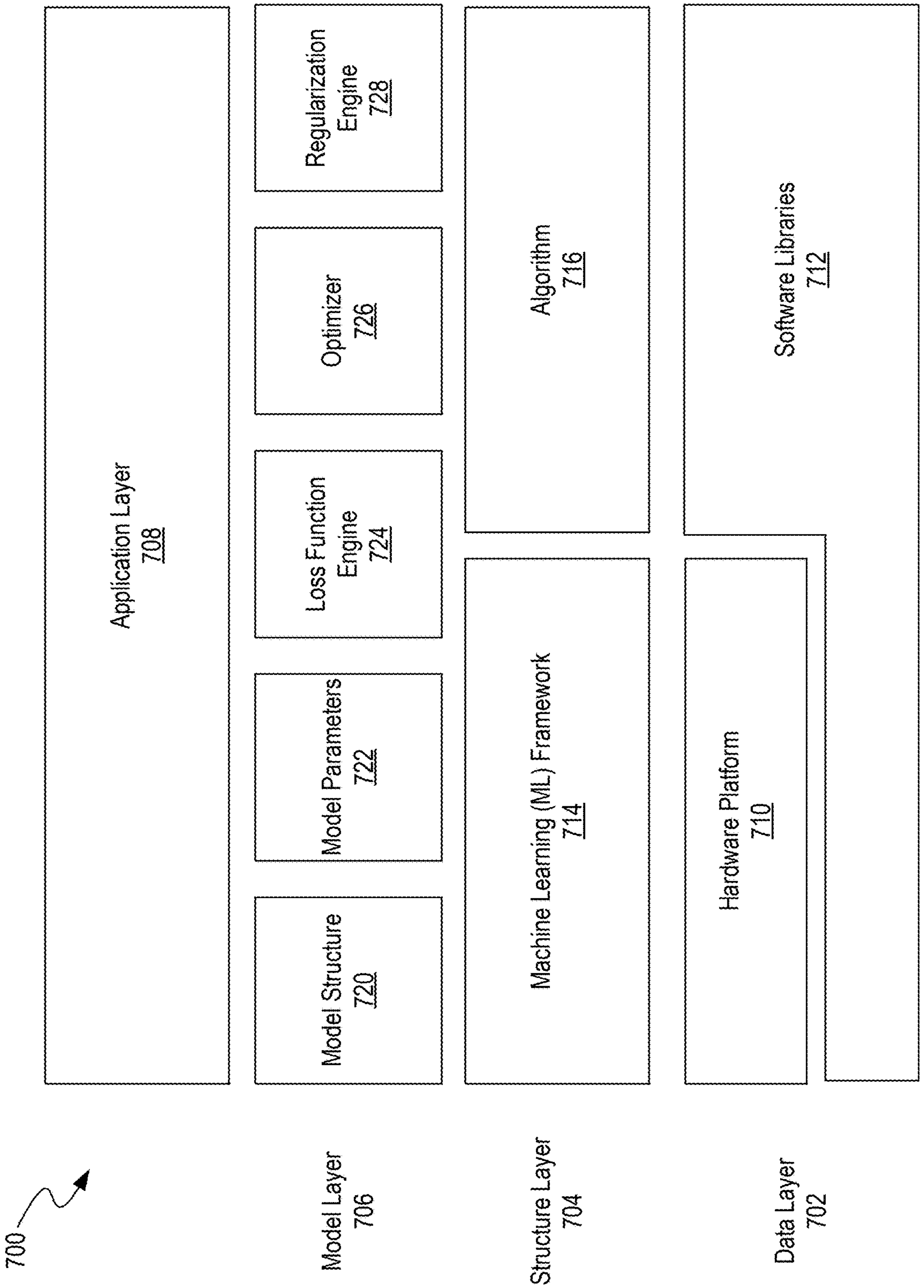
FIG. 7 illustrates a layered architecture of an AI system that can implement the machine learning (ML) models of the transmission platform, in accordance with some implementations of the present technology.

FIG. 7 illustrates a layered architecture of an AI system 700 that can implement the ML models discussed herein, in accordance with some implementations of the present technology. Example ML models can include the models executed by the audience generation system. Accordingly, the audience generation system can include one or more components of the AI system 700.

As shown, the AI system 700 can include a set of layers, which conceptually organize elements within an example network topology for the AI system's architecture to implement a particular AI model. Generally, an AI model is a computer-executable program implemented by the AI system 700 that analyzes data to make predictions. Information can pass through each layer of the AI system 700 to generate outputs for the AI model. The layers can include a data layer 702, a structure layer 704, a model layer 706, and an application layer 708. The algorithm 716 of the structure layer 704 and the model structure 720 and model parameters 722 of the model layer 706 together form an example AI model. The optimizer 726, loss function engine 724, and regularization engine 728 work to refine and optimize the AI model, and the data layer 702 provides resources and support for application of the AI model by the application layer 708.

The data layer 702 acts as the foundation of the AI system 700 by preparing data for the AI model. As shown, the data layer 702 can include two sub-layers: a hardware platform 710 and one or more software libraries 712. The hardware platform 710 can be designed to perform operations for the AI model and include computing resources for storage, memory, logic and networking. The hardware platform 710 can process amounts of data using one or more servers. The servers can perform backend operations such as matrix calculations, parallel calculations, ML training, and the like. Examples of servers used by the hardware platform 710 include central processing units (CPUs) and GPUs. CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 710 can include computing resources (e.g., servers, memory, etc.) offered by a cloud services provider. The hardware platform 710 can also include computer memory for storing data about the AI model, application of the AI model, and training data for the AI model. The computer memory can be a form of random-access memory (RAM), such as dynamic RAM, static RAM, and non-volatile RAM.

The software libraries 712 can be thought of as suites of data and programming code, including executables, used to control the computing resources of the hardware platform 710. The programming code can include low-level primitives (e.g., fundamental language elements) that form the foundation of one or more low-level programming languages such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include INTEL Math Kernel Library, NVIDIA cuDNN, EIGEN, and OpenBLAS.

The structure layer 704 can include an ML framework 714 and an algorithm 716. The ML framework 714 can be thought of as an interface, library, or tool that allows users to build and deploy the AI model. The ML framework 714 can include an open-source library, an API, a gradient-boosting library, an ensemble method, and/or a deep learning toolkit that work with the layers of the AI system to facilitate development of the AI model. For example, the ML framework 714 distributes processes for application or training of the AI model across multiple resources in the hardware platform 710. The ML framework 714 can also include a set of pre-built components that have the functionality to implement and train the AI model and allow users to use pre-built functions and classes to construct and train the AI model. Thus, the ML framework 714 can be used to facilitate data engineering, development, hyperparameter tuning, testing, and training for the AI model. Examples of ML frameworks 714 that can be used in the AI system 700 include TENSORFLOW, PYTORCH, SCIKIT-LEARN, KERAS, LightGBM, RANDOM FOREST, and AMAZON WEB SERVICES.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model through being trained while running computing resources of the hardware platform 710. This training allows the algorithm 716 to make predictions or decisions without being explicitly programmed to do so. Once trained, the algorithm 716 can run at the computing resources as part of the AI model to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data can be labeled by an external user or operator. For instance, a user can collect a set of training data, such as by capturing data from sensors, images from a camera, outputs from a model, and the like. In an example implementation, training data can include digital identifier behavioral data collected from various digital platforms and textual attribute descriptions from various data management systems. Furthermore, training data can include preprocessed data generated by various engines of the audience generation system described herein. The user can label the training data based on one or more classes and trains the AI model by inputting the training data to the algorithm 716. The algorithm determines how to label the new data based on the labeled training data. The user can facilitate collection, labeling, and/or input via the ML framework 714. In some instances, the user can convert the training data to a set of feature vectors for input to the algorithm 716. Once trained, the user can test the algorithm 716 on new data to determine if the algorithm 716 is predicting accurate labels for the new data. For example, the user uses cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., various digital identifier behavioral patterns, demographic attributes, textual attribute descriptions extracted from external data sources) relate to the categories (e.g., audience segment categories, conversion propensity categories, digital advertising targeting categories). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based preprocessing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format. The audience generation system can use unsupervised learning to identify patterns in digital identifier behavior (e.g., to identify particular conversion sequences) and textual attribute description patterns. In some implementations, performance of the audience generation system that can use unsupervised learning is improved because the incoming data from external sources is preprocessed and reduced, based on the relevant triggers, as described herein.

A few techniques can be used in supervised learning: clustering, anomaly detection, and techniques for learning latent variable models. Clustering techniques involve grouping data into different clusters that include similar data such that other clusters contain dissimilar data. For example, during clustering, data with possible similarities remain in a group that has less or no similarities to another group. Examples of clustering techniques include density-based methods, hierarchical-based methods, partitioning methods, and grid-based methods. In one example, the algorithm 716 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 can be trained to be an Isolation Forest, local outlier factor (LOF) algorithm, or k-NN algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 716 include factor analysis, item response theory, latent profile analysis, and latent class analysis.

The model layer 706 implements the AI model using data from the data layer 702 and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model of the AI system 700. The model structure 720 defines the complexity of the pattern/relationship that the AI model expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how the node converts data received to data output. The structure layers can include an input layer of nodes that receive input data and an output layer of nodes that produce output data. The model structure 720 can include one or more hidden layers of nodes between the input and output layers. The model structure 720 can be an artificial neural network (or, simply, neural network) that connects the nodes in the structured layers such that the nodes are interconnected. Examples of neural networks include feedforward neural networks, CNNs, RNNs, Autoencoder, and GANs.

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's performance during training. For instance, the loss function engine 724 can measure the difference between a predicted output of the AI model and the actual output of the AI model and is used to guide optimization of the AI model during training to minimize the loss function. The loss function can be presented via the ML framework 714 such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 726 used can be determined based on the type of model structure 720 and the size of data and the computing resources available in the data layer 702.

The regularization engine 728 executes regularization operations. Regularization is a technique that prevents over-fitting and underfitting of the AI model. Overfitting occurs when the algorithm 716 is overly complex and too adapted to the training data, which can result in poor performance of the AI model. Underfitting occurs when the algorithm 716 is unable to recognize even basic patterns from the training data such that it cannot perform well on training data or on validation data. The optimizer 726 can apply one or more regularization techniques to fit the algorithm 716 to the training data properly, which helps constrain the resulting AI model and improves its ability for generalized application. Examples of regularization techniques include lasso (L1) regularization, ridge (L2) regularization, and elastic (L1 and L2) regularization.

The application layer 708 describes how the AI system 700 is used to solve problems or perform tasks. In an example implementation, the application layer 708 can include the audience generation system for digital advertising targeting.

Example Computing Environment of the Audience Generation System

Figure 8:
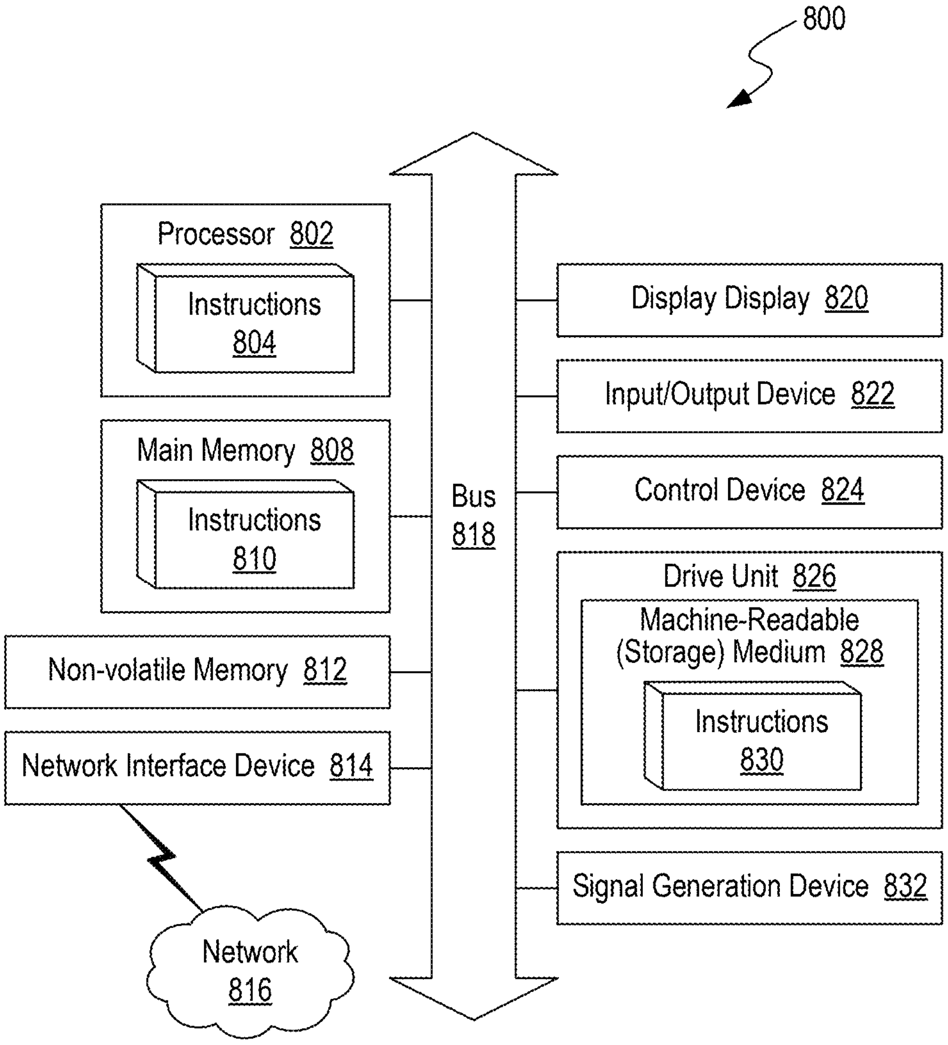
FIG. 8 is a block diagram showing some of the components typically incorporated in at least some of the computer systems and other devices on which the transmission platform operates, in accordance with some implementations of the present technology.

FIG. 8 is a block diagram showing some of the components typically incorporated in at least some of the computer system 800 on which the disclosed system operates, in accordance with some implementations of the present technology. As shown, an example computer system 800 can include one or more processors 802, main memory 808, non-volatile memory 812, a network interface device 814, a video display device 820, an I/O device 822, a control device 824 (e.g., keyboard and pointing device), a drive unit 826 that includes a machine-readable (storage) medium 828, and a signal generation device 832 that are communicatively connected to a bus 818. The bus 818 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 shares a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer (SBC) system or a distributed system such as a mesh of computer systems or include one or more cloud components in one or more networks. Where appropriate, one or more computer systems 800 can perform operations in real time, near real time, or in batch mode.

The network interface device 814 enables the computer system 800 to exchange data in a network 816 with an entity that is external to the computing system 800 through any communication protocol supported by the computing system 800 and the external entity. Examples of the network interface device 814 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 808, non-volatile memory 812, machine-readable (storage) medium 828) can be local, remote, or distributed. Although shown as a single medium, the machine-readable (storage) medium 828 can include multiple media (e.g., a centralized/distributed database and/or associated caches and servers) that store one or more sets of instructions 830. The machine-readable (storage) medium 828 can include any medium that is capable of storing, encoding, or carrying a set of instructions for execution by the computer system 800. The machine-readable (storage) medium 828 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 810, 830) set at various times in various memory and storage devices in computing device(s). When read and executed by the processor 802, the instruction(s) cause the computer system 800 to perform operations to execute elements involving the various aspects of the disclosure.

Figure 9:
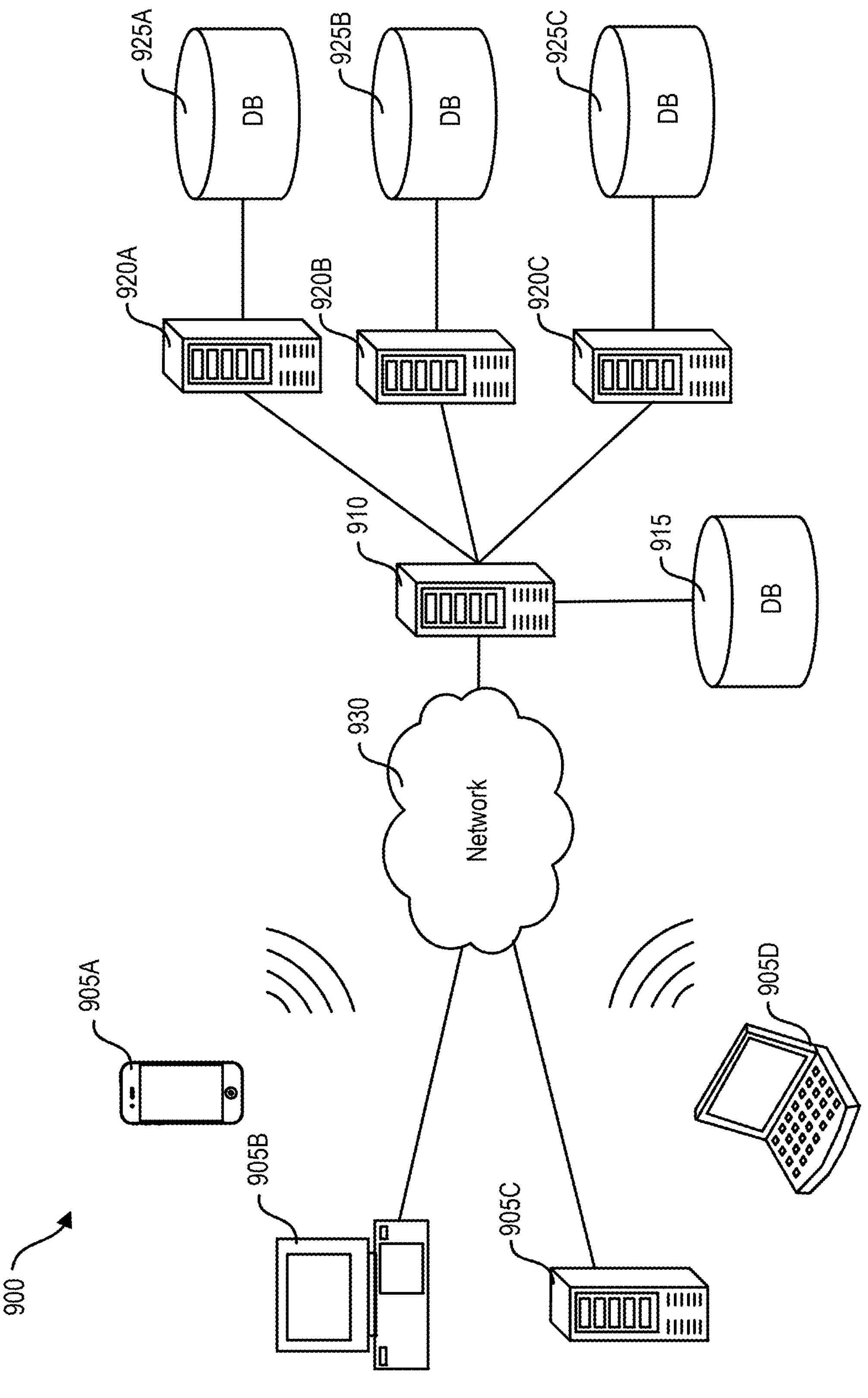
FIG. 9 is a system diagram illustrating an example of a computing environment in which the disclosed system operates, in accordance with some implementations of the present technology.

FIG. 9 is a system diagram illustrating an example of a computing environment 900 in which the disclosed system operates, in accordance with some implementations of the present technology. In some implementations, computing environment 900 includes one or more client computing devices 905A-D, examples of which can host the audience generation system. Client computing devices 905 operate in a networked environment using logical connections through network 930 to one or more remote computers, such as a server computing device.

In some implementations, server 910 is an edge server that receives client requests and coordinates fulfillment of those requests through other servers, such as servers 920A-C. In some implementations, server computing devices 910 and 920 comprise computing systems, such as the audience generation system. Though each server computing device 910 and 920 is displayed logically as a single server, server computing devices can each be a distributed computing environment encompassing multiple computing devices located at the same or at geographically disparate physical locations. In some implementations, each server 920 corresponds to a group of servers.

Client computing devices 905 and server computing devices 910 and 920 can each act as a server or client to other server or client devices. In some implementations, servers (910, 920A-C) connect to a corresponding database (915, 925A-C). As discussed above, each server 920 can correspond to a group of servers, and each of these servers can share a database or can have its own database. Databases 915 and 925 warehouse (e.g., store) information such as digital identifier behavioral data, textual attribute descriptions, audience segment profiles, embedding vectors, and probability scores. Though databases 915 and 925 are displayed logically as single units, databases 915 and 925 can each be a distributed computing environment encompassing multiple computing devices, can be located within their corresponding server, or can be located at the same or at geographically disparate physical locations.

Network 930 can be a local area network (LAN) or a wide area network (WAN), but it can also be other wired or wireless networks. In some implementations, network 930 is the internet or some other public or private network. Client computing devices 905 are connected to network 930 through a network interface, such as by wired or wireless communication. While the connections between server 910 and servers 920 are shown as separate connections, these connections can be any kind of local area, wide area, wired, or wireless network, including network 930 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology include not only additional elements to those implementations noted above but also can include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms in either this application or in a continuing application.

We claim:

1. A computer-implemented method for generating predictive data segments using machine learning models and natural language processing techniques, the computer-implemented method comprising:

receiving training data comprising a plurality of training digital identifiers and corresponding binary classification labels, wherein each binary classification label indicates whether a corresponding training digital identifier is associated with a target outcome;

accessing one or more external data sources comprising structured and unstructured data, wherein the structured and unstructured data comprises training textual attribute descriptions associated with the plurality of training digital identifiers;

preprocessing the training textual attribute descriptions by (i) concatenating multiple training textual attribute descriptions per training digital identifier and (ii) formatting the concatenated training textual attribute descriptions into a unified text string for input to a large language model;

inputting the unified text string into the large language model to cause the large language model to output a plurality of training high-dimensional vector embeddings encoding semantic relationships and contextual information of the training textual attribute descriptions in a continuous vector space;

training a neural network using the plurality of training high-dimensional vector embeddings and the corresponding binary classification labels, wherein the neural network learns to predict probability scores for high-dimensional vector embeddings;

receiving new data comprising a plurality of new digital identifiers;

preprocessing new textual attribute descriptions associated with the plurality of new digital identifiers derived from the one or more external data sources by concatenating multiple new textual attribute descriptions per new digital identifier and formatting the concatenated new textual attribute descriptions into a new unified text string for input to the large language model;

inputting the new unified text string into the large language model to cause the large language model to output a plurality of new high-dimensional vector embeddings;

generating a plurality of probability scores for the plurality of new digital identifiers by applying the neural network to the plurality of new high-dimensional vector embeddings, wherein each probability score represents a conversion propensity value for a corresponding new digital identifier;

selecting a subset of the plurality of new digital identifiers having probability scores exceeding a configurable threshold; and transmitting the subset of the plurality of new digital identifiers to a digital platform for prioritized resource allocation.

2. The computer-implemented method of claim 1, wherein the training textual attribute descriptions comprise demographic segment descriptions, behavioral attribute descriptions, and household characteristic descriptions, and wherein preprocessing the training textual attribute descriptions further comprises applying text normalization and tokenization processes to standardize textual formats across different data sources.

3. The computer-implemented method of claim 1, wherein the large language model comprises a transformer-based architecture with attention mechanisms, and wherein the plurality of training high-dimensional vector embeddings have a dimensionality that captures semantic relationships and contextual information from the training textual attribute descriptions.

4. The computer-implemented method of claim 1, wherein training the neural network comprises applying data balancing techniques to address class imbalance between positive and negative binary classification labels, and wherein the data balancing techniques include at least one of a synthetic minority oversampling technique, undersampling of majority class samples, or weighted loss functions.

5. The computer-implemented method of claim 1, wherein generating the plurality of probability scores further comprises applying a secondary machine learning model to transform the probability scores into bid adjustment values for real-time bidding systems, and wherein the bid adjustment values are calculated based on a value-to-cost ratio based at least in part on conversion propensity.

6. The computer-implemented method of claim 1, further comprising:

monitoring performance metrics of the subset of the plurality of new digital identifiers;

detecting distribution drift in new incoming data by comparing statistical properties of current data against reference baseline data; and automatically triggering retraining of the neural network based on the distribution drift exceeding a predetermined threshold.

7. A computer-implemented method comprising:

receiving training data comprising a plurality of training digital identifiers and corresponding binary classification labels, wherein each binary classification label indicates whether a corresponding training digital identifier is associated with a target outcome;

accessing one or more external data sources comprising training textual attribute descriptions associated with the plurality of training digital identifiers;

preprocessing the training textual attribute descriptions by concatenating multiple training textual attribute descriptions per training digital identifier and formatting the concatenated training textual attribute descriptions into a unified text string for input to a large language model;

inputting the unified text string into the large language model to cause the large language model to output a plurality of training high-dimensional vector embeddings encoding semantic relationships and contextual information of the training textual attribute descriptions; and training a neural network using the plurality of training high-dimensional vector embeddings and the corresponding binary classification labels, wherein the neural network learns to predict probability scores for high-dimensional vector embeddings.

8. The computer-implemented method of claim 7, wherein the training textual attribute descriptions comprise demographic segment descriptions, behavioral attribute descriptions, and household characteristic descriptions, and wherein preprocessing the training textual attribute descriptions further comprises applying text normalization and tokenization processes to standardize textual formats across different data sources.

9. The computer-implemented method of claim 7, wherein the large language model comprises a transformer-based architecture with attention mechanisms, and wherein the plurality of training high-dimensional vector embeddings have a dimensionality that captures semantic relationships and contextual information from the training textual attribute descriptions.

10. The computer-implemented method of claim 7, wherein training the neural network comprises applying data balancing techniques to address class imbalance between positive and negative binary classification labels, and wherein the data balancing techniques include at least one of a synthetic minority oversampling technique, undersampling of majority class samples, or weighted loss functions.

11. The computer-implemented method of claim 7, further comprising:

receiving new data comprising a plurality of new digital identifiers;

preprocessing new textual attribute descriptions associated with the plurality of new digital identifiers derived from the one or more external data sources by concatenating multiple new textual attribute descriptions per new digital identifier and formatting the concatenated new textual attribute descriptions into a new unified text string for input to the large language model;

inputting the new unified text string into the large language model to cause the large language model to output a plurality of new high-dimensional vector embeddings;

generating a plurality of probability scores for the plurality of new digital identifiers by applying the neural network to the plurality of new high-dimensional vector embeddings, wherein each probability score represents a conversion propensity value for a corresponding new digital identifier;

selecting a subset of the plurality of new digital identifiers having probability scores exceeding a configurable threshold; and transmitting the subset of the plurality of new digital identifiers to a digital platform for prioritized resource allocation.

12. The computer-implemented method of claim 11, wherein generating the plurality of probability scores further comprises applying a secondary machine learning model to transform the probability scores into bid adjustment values for real-time bidding systems, and wherein the bid adjustment values are calculated based on a value-to-cost ratio based at least in part on conversion propensity.

13. The computer-implemented method of claim 11, further comprising:

monitoring performance metrics of the subset of the plurality of new digital identifiers;

detecting distribution drift in new incoming data by comparing statistical properties of current data against reference baseline data; and automatically triggering retraining of the neural network based on the distribution drift exceeding a predetermined threshold.

14. A system comprising:

at least one hardware processor; and at least one non-transitory memory storing instructions, which, when executed by the at least one hardware processor, cause the system to:

receive data comprising a plurality of digital identifiers;

preprocess textual attribute descriptions associated with the plurality of digital identifiers derived from one or more external data sources by concatenating multiple textual attribute descriptions per digital identifier and formatting the concatenated textual attribute descriptions into a unified alphanumeric set for input to an artificial intelligence (AI) model;

input the unified alphanumeric set into the AI model to cause the AI model to output a plurality of high-dimensional vector embeddings encoding semantic relationships and new contextual information of the textual attribute descriptions;

generate a plurality of probability scores for the plurality of digital identifiers by applying a trained neural network to the plurality of high-dimensional vector embeddings, wherein each probability score represents a conversion propensity value for a corresponding digital identifier; and create a plurality of data partitions by selecting a subset of the plurality of digital identifiers having probability scores exceeding a threshold.

15. The system of claim 14, wherein the instructions for generating the plurality of probability scores further cause the system to apply a secondary machine learning model to transform the probability scores into bid adjustment values for real-time bidding systems, and wherein the bid adjustment values are calculated based on a value-to-cost ratio based at least in part on conversion propensity.

16. The system of claim 14, wherein the instructions further cause the system to:

monitor performance metrics of the subset of the plurality of new digital identifiers;

detect distribution drift in new incoming data by comparing statistical properties of current data against reference baseline data; and automatically trigger retraining of the neural network based on the distribution drift exceeding a predetermined threshold.

17. The system of claim 14, wherein the neural network is trained using instructions that further cause the system to:

receive training data comprising a plurality of training digital identifiers and corresponding binary classification labels, wherein each binary classification label indicates whether a corresponding training digital identifier is associated with a target outcome;

access one or more external data sources comprising structured and unstructured data, wherein the structured and unstructured data comprises training textual attribute descriptions associated with the plurality of training digital identifiers;

preprocess the training textual attribute descriptions by (i) concatenating multiple training textual attribute descriptions per training digital identifier and (ii) formatting the concatenated training textual attribute descriptions into a training unified alphanumeric set for input to the AI model;

input the training unified alphanumeric set into the AI model to cause the AI model to output a plurality of training high-dimensional vector embeddings encoding semantic relationships and contextual information of the training textual attribute descriptions in a continuous vector space; and train a neural network using the plurality of training high-dimensional vector embeddings and the corresponding binary classification labels, wherein the neural network learns to predict probability scores for high-dimensional vector embeddings.

18. The system of claim 17, wherein the training textual attribute descriptions comprise demographic segment descriptions, behavioral attribute descriptions, and household characteristic descriptions, and wherein preprocessing the training textual attribute descriptions further comprises applying text normalization and tokenization processes to standardize textual formats across different data sources.

19. The system of claim 17, wherein the AI model comprises a transformer-based architecture with attention mechanisms, and wherein the plurality of training high-dimensional vector embeddings have a dimensionality that captures semantic relationships and contextual information from the training textual attribute descriptions.

20. The system of claim 17, wherein the instructions for training the neural network further cause the system to apply data balancing techniques to address class imbalance between positive and negative binary classification labels, and wherein the data balancing techniques include at least one of a synthetic minority oversampling technique, undersampling of majority class samples, or weighted loss functions.

* * * * *